(12) United States Patent
Do

(10) Patent No.: US 8,838,180 B2
(45) Date of Patent: Sep. 16, 2014

(54) RELATIONAL RENDERING WITH A MOBILE TERMINAL

(75) Inventor: Ho-Seok Do, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 359 days.

(21) Appl. No.: 12/717,345

(22) Filed: Mar. 4, 2010

(65) Prior Publication Data

US 2011/0009103 A1 Jan. 13, 2011

(30) Foreign Application Priority Data

Jul. 8, 2009 (KR) ........................ 10-2009-0062275

(51) Int. Cl.
| | | |
|---|---|---|
| H04B 1/38 | (2006.01) | |
| H04M 1/2745 | (2006.01) | |
| G06F 3/0482 | (2013.01) | |
| G06F 3/0488 | (2013.01) | |
| G06F 17/30 | (2006.01) | |
| H04M 1/725 | (2006.01) | |
| G09G 5/00 | (2006.01) | |
| H04W 8/18 | (2009.01) | |

(52) U.S. Cl.
CPC ......... *H04M 1/27455* (2013.01); *G06F 3/0482* (2013.01); *G06F 3/04883* (2013.01); *G06F 3/04886* (2013.01); *G06F 17/30265* (2013.01); *G09G 5/00* (2013.01); *G09G 2340/04* (2013.01); *G09G 2340/14* (2013.01); *H04M 1/274583* (2013.01); *H04M 1/72583* (2013.01); *H04M 1/72586* (2013.01); *H04W 8/183* (2013.01)
USPC .......................................... 455/566; 455/418

(58) Field of Classification Search
CPC ............ H04M 1/72519; G06Q 10/109; G06F 3/0481; G06F 3/04812; H04W 92/00
USPC ............. 455/412.1–414.4, 418–422.1, 432.3, 455/457, 460, 461, 463, 466, 550.1, 552.1, 455/553.1, 556.1, 556.2, 557, 564–566; 345/156–184, 660–671; 370/310.2, 370/328, 338, 352–356; 707/790–899; 715/246, 706, 739, 745, 764–769, 772, 715/845, 846, 849, 859–864, 963, 968, 715/788–826

See application file for complete search history.

(56) References Cited

U.S. PATENT DOCUMENTS

| | | | |
|---|---|---|---|
| 7,216,304 B1 * | 5/2007 | Gourdol et al. ............... | 715/835 |
| 7,375,730 B2 * | 5/2008 | Tagliabue et al. ............ | 345/581 |
| 2004/0250217 A1 * | 12/2004 | Tojo et al. ..................... | 715/810 |
| 2005/0124388 A1 * | 6/2005 | Seo et al. ..................... | 455/566 |
| 2005/0227680 A1 * | 10/2005 | Snowden ...................... | 455/416 |
| 2007/0256035 A1 * | 11/2007 | Matsuzawa et al. .......... | 715/864 |
| 2008/0211824 A1 * | 9/2008 | Honda et al. ................. | 345/552 |
| 2009/0023472 A1 * | 1/2009 | Yoo et al. .................... | 455/556.1 |
| 2010/0004008 A1 * | 1/2010 | Abolrous et al. ............. | 455/466 |

* cited by examiner

Primary Examiner — San Htun
(74) Attorney, Agent, or Firm — Fish & Richardson P.C.

(57) ABSTRACT

Data storing multiple contact entries is access and at least two of the contact entries are selected from the accessed data. A phone number and an image are associated with at least two selected contact entries. A relational characteristic is determined for the selected contact entries. A rendering size is determined for each of the selected contact entries of the image associated with the contact entry based on the determined relational characteristic for the contact entry. A composite display that enables concurrent rendering of the images associated with the selected contact entries is generated. The composite display renders each of the images according to its determined rendering size. Rendering of the generated composite display is enabled.

20 Claims, 16 Drawing Sheets

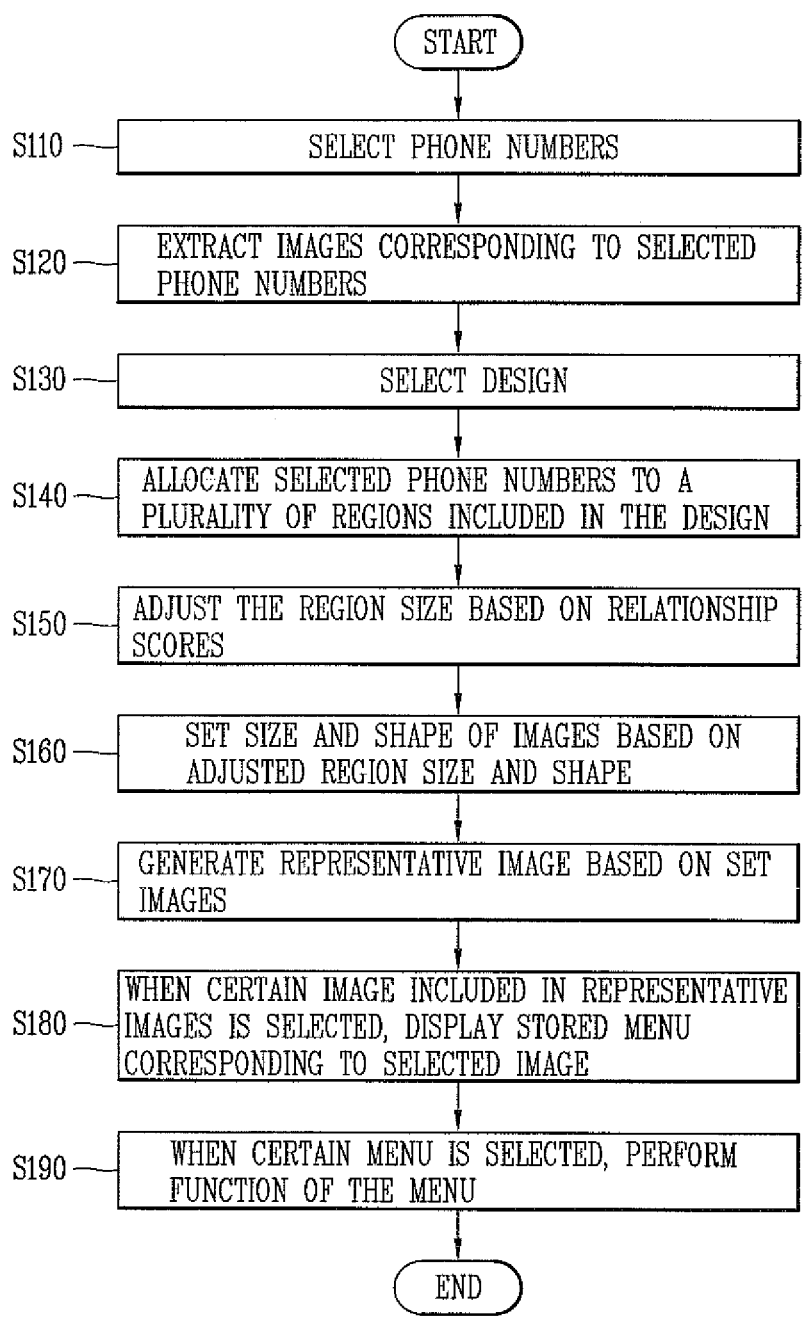

RELATIONAL RENDERING WITH A MOBILE TERMINAL

CROSS-REFERENCE TO A RELATED APPLICATION

Pursuant to 35 U.S.C. §119(a), this application claims the benefit of the earlier filing date and right of priority to Korean Application No. 10-2009-0062275, filed on Jul. 8, 2009, the contents of which is incorporated by reference herein in its entirety.

BACKGROUND

Mobile devices can be used to provide wireless communication between users. As mobile device capability has advanced in recent years, mobile devices have increasingly become able to provide functionality in addition to wireless communication. For example, some mobile devices provide global positioning system (GPS) functionality. Other mobile devices provide a display and touch screen functionality.

SUMMARY

In general, in some aspects, a method includes accessing data storing multiple contact entries and selecting, from the accessed data, at least two of the contact entries. The method also includes associating a phone number and an image with each of the at least two selected contact entries and determining a relational characteristic for each of the selected contact entries. The method further includes determining, for each of the selected contact entries, a rendering size of the image associated with the contact entry based on the determined relational characteristic for the contact entry. In addition, the method includes generating a composite display that enables concurrent rendering of the images associated with the selected contact entries. The composite display renders each of the images according to its determined rendering size. Lastly, the method includes enabling rendering of the generated composite display.

This and other implementations can optionally include one or more of the following features, which also may optionally be in any combination. For example, accessing the data storing multiple contact entries can include accessing a phonebook stored in memory of a mobile telephone. Determining the relation characteristic of each of the selected contact entries can include calculating a relationship score for each of the selected contact entries. Calculating the relationship score can include determining a frequency of interaction with the contact entry. Calculating the relationship score can include determining a quantity of interaction with the contact entry. Determining the relation characteristic of each of the selected contact entries includes receiving input specifying a user preference related to the relational characteristic.

Also, the selected contact entries can include a first contact entry associated with a first image and a first phone number and a second contact entry associated with a second image and a second phone number, wherein the first and second phone numbers differ and the first and second images differ. Determining the relational characteristic for each of the selected contact entries can include determining a first relational characteristic for the first contact entry, and determining a second relational characteristic for the second contact entry. The first relational characteristic can be different than the second relational characteristic. Determining the rendering size of the image associated with the contact entry based on the determined relational characteristic for the contact entry can include determining a first rendering size of the first image based on the determined first relational characteristic for the first contact entry, and determining a second rendering size of the second image based on the determined second relational characteristic for the second contact entry. The first rendering size can be different than the second rendering size. Finally, generating the composite display that enables concurrent rendering of images associated with the selected contact entries can include generating a composite display that enables concurrent rendering of the first image based on the first rendering size and the second image based on the second rendering size.

Further, generating the composite display that enables concurrent rendering of the first image based on the first rendering size and the second image based on the second rendering size can include dividing available display screen size proportionately based on the value of the determined first and second rendering size of each of the images so as to utilize the available display screen. The method can also include receiving input directed to a region used to display the first image of the rendered composite display and activating functionality directed to the first contact entry in response to receiving the input directed to the first image. The first image can be a photograph and the second image can be an icon.

In addition, determining the rendering size of the image can include determining a dynamic rendering size for at least one image. The dynamic rendering size can enable the rendering size of the image to increase or decrease with respect to time. Determining a dynamic rendering size for at least one image can include determining a dynamic rendering size of multiple images. Selecting the at least two contact entries can include selecting, from the accessed data, the phone number and the image associated with each of the at least two selected contact entries. The selecting of the at least two of the contact entries can occur after the associating of the phone number and the image with the at least two contact entries. Determining the rendering size of the image can include determining a rendering size of a region of the composite display and associating the determined rendering size of the region of the composite display with the image. Generating the composite display can include dividing available display screen size proportionately based on the value of the determined rendering size of each of the images.

In other implementations, some aspects include a communication terminal. The terminal includes a computer-readable medium configured to store multiple contact entries and a phone number and an image associated with each of the multiple contact entries. The terminal also includes a display unit and a controller. The controller is configured to access, from the computer-readable medium, data storing multiple contact entries and select, from the accessed data, at least two of the contact entries. The controller is also configured to determine a relational characteristic for each of the selected contact entries and determine, for each of the selected contact entries, a rendering size of the image associated with the contact entry based on the determined relational characteristic for the contact entry. The controller is further configured to generate a composite display that enables concurrent rendering of the images associated with the selected contact entries, wherein the composite display renders each of the images according to its determined rendering size and render the generated composite display on the display unit.

This and other implementations can optionally include one or more of the following features, which also may optionally be in any combination. For example, to determine the relation characteristic of each of the selected contact entries, the controller can be configured to calculate a relationship score for each of the selected contact entries. To calculate the relationship score, the controller can be configured to determine a frequency of interaction with the contact entry. To calculate the relationship score, the controller can be configured to determine a quantity of interaction with the contact entry. To determine the relation characteristic of each of the selected contact entries, the controller can be configured to receive input specifying a user preference related to the relational characteristic. To determine the rendering size of the image, the controller can be configured to determine a dynamic rendering size for at least one image, wherein the dynamic rendering size enables the rendering size of the image to increase or decrease with respect to time. The controller can include one or more processors.

In other implementations, some aspects a method. The method includes selecting multiple contacts from stored data and determining a relational characteristic for each of the selected contacts. The method also includes determining, for each of the selected contacts, a rendering size associated with the contact based on the relational characteristic for the contact. The method further includes generating a composite display that includes graphical information associated with each of the selected contacts. The composite display enables concurrent rendering of the graphical information associated with the selected contacts according to its determined rendering sizes determined for the graphical information associated with the selected contacts.

This and other implementations can optionally include one or more of the following features, which also may optionally be in any combination. For example, selecting the data storing multiple contacts can include selecting contact entries from a phonebook stored in memory of a mobile telephone. Determining the relation characteristic of each of the selected contacts can include calculating a relationship score for each of the selected contacts. Calculating the relationship score can include determining a frequency of interaction with the contact. Calculating the relationship score can include determining a quantity of interaction with the contact. Determining the relation characteristic of each of the selected contacts can include receiving input specifying a user preference related to the relational characteristic.

Also, the selected contacts can include a first contact associated with a first image and a first phone number and a second contact associated with a second image and a second phone number. The first and second phone numbers can differ and the first and second images can differ. Determining the relational characteristic for each of the selected contacts can include determining a first relational characteristic for the first contact and determining a second relational characteristic for the second contact, wherein the first relational characteristic is different than the second relational characteristic. Determining the rendering size associated with the contact based on the determined relational characteristic for the contact can includes determining a first rendering size based on the determined first relational characteristic for the first contact, and determining a second rendering size based on the determined second relational characteristic for the second contact, wherein the first rendering size is different than the second rendering size. Generating a composite display that enables concurrent rendering of the graphical information associated with the selected contacts can include generating a composite display that enables concurrent rendering of first graphical information based on the first rendering size and second graphical information based on the second rendering size.

Further, the method can also include receiving input directed to a region used to display the first graphical information of the rendered composite display and activating functionality directed to the first contact in response to receiving the input directed to the first graphical information. The first graphical information can be an icon and the second graphical information can be text. Determining the rendering size can include determining a dynamic rendering size. The dynamic rendering size can enable the rendering size of graphical information to increase or decrease with respect to time.

In other implementations, some aspects include a system. The system includes a computer-readable medium configured to store multiple contacts such that each of the multiple contacts is associated with a phone number and an image and one or more processors. The one or more processors are configured to select, from the computer-readable medium, multiple contacts and determine a relational characteristic for each of the selected contacts. The one or more processors are also configured to determine, for each of the selected contacts, a rendering size associated with the contact based on the relational characteristic for the contact. The one or more processors are further configured to generate a composite display that includes graphical information associated with the multiple contacts, wherein the composite display enables concurrent rendering of the graphical information associated with each of the multiple contacts according to its determined rendering sizes determined for the graphical information associated with the selected contacts and communicate the generated composite display to a display unit.

This and other implementations can optionally include one or more of the following features, which also may optionally be in any combination. For example, to determine the relation characteristic of each of the selected contacts, the one or more processors can be configured to calculate a relationship score for each of the selected contacts. To calculate the relationship score, the one or more processors can be configured to determine a frequency of interaction with the contact. To calculate the relationship score, the one or more processors can be configured to determine a quantity of interaction with the contact.

Also, to determine the relation characteristic of each of the selected contacts, the one or more processors can be configured to receive input specifying a user preference related to the relational characteristic. To determine the rendering, the one or more processors are can be configured to determine a dynamic rendering size. The dynamic rendering size can enable the rendering size to increase or decrease with respect to time. The one or more processors can include one or more processors.

The foregoing and other objects, features, aspects and advantages will become more apparent from the following detailed description when taken in conjunction with the accompanying drawings.

BRIEF DESCRIPTION OF THE DRAWINGS

FIG. 4 is a flow chart of a first process for controlling a mobile terminal.

Like reference symbols in the various drawings indicate like elements.

DETAILED DESCRIPTION

Figure 1:
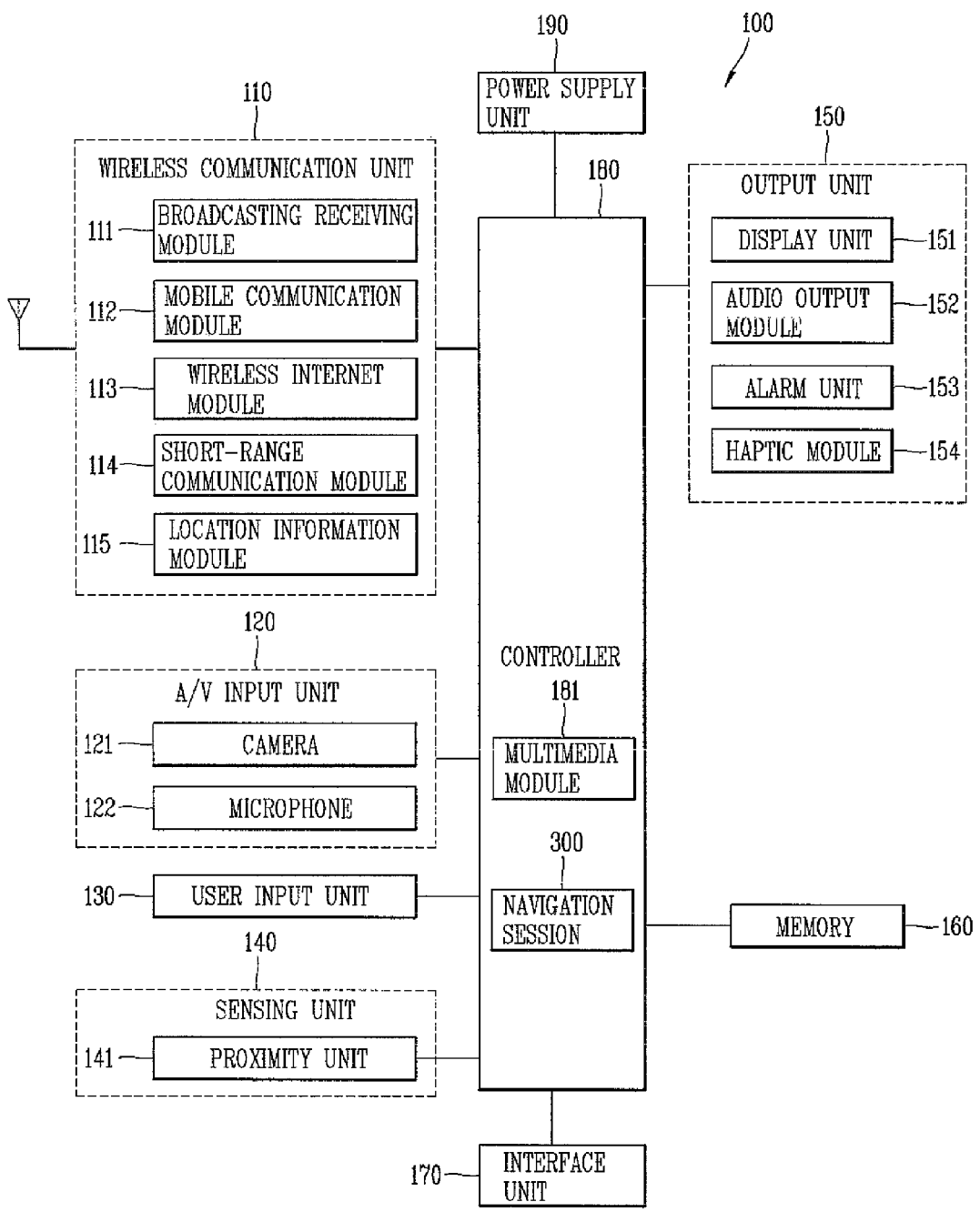
FIG. 1 is a schematic block diagram showing a configuration of a mobile terminal.

FIG. 1 is a schematic block diagram showing a configuration of a mobile communication terminal employing an image display apparatus. The mobile terminal 100 may be implemented in various forms, such as mobile phones, smart phones, notebook computers, digital broadcast terminals, PDAs (Personal Digital Assistants), PMPs (Portable Multimedia Player), or other devices.

As shown in FIG. 1, the mobile terminal 100 includes a wireless communication unit 110, an A/V (Audio/Video) input unit 120, a user input unit 130, a sensing unit 140, an output unit 150, a memory 160, an interface unit 170, a controller 180, and a power supply unit 190. The configuration of FIG. 1 is exemplary, as the mobile terminal 100 may be implemented by greater or fewer components.

The wireless communication unit 110 can include one or more components providing functionality for radio communication between the mobile terminal 100 and a wireless communication system or a network in which the mobile communication terminal is located. For example, the wireless communication unit may include at least one of a broadcast receiving module 111, a mobile communication module 112, a wireless Internet module 113, a short-range communication module 114, and a location information module 115.

The broadcast receiving module 111 receives broadcast signals and/or broadcast associated information from an external broadcast management server (or other network entity) via a broadcast channel. The broadcast channel may include a satellite channel and/or a terrestrial channel. The broadcast management server may be a server that generates and transmits a broadcast signal and/or broadcast associated information or a server that receives a previously generated broadcast signal and/or broadcast associated information and transmits the same to a terminal. The broadcast associated information may refer to information associated with a broadcast channel, a broadcast program or a broadcast service provider. The broadcast signal may include a TV broadcast signal, a radio broadcast signal, a data broadcast signal, or another signal. Also, the broadcast signal may further include a broadcast signal combined with a TV or radio broadcast signal.

The broadcast associated information also may be provided via a mobile communication network and, in this case, the broadcast associated information may be received by the mobile communication module 112. The broadcast signal may exist in various forms. For example, broadcast associated information may be implemented according to various formats, such as electronic program guide (EPG) of digital multimedia broadcasting (DMB) or electronic service guide (ESG) of digital video broadcast-handheld (DVB-H).

The broadcast receiving module 111 may be configured to receive signals broadcast by using various types of broadcast systems. In particular, the broadcast receiving module 111 may receive a digital broadcast using a digital broadcast system, such as multimedia broadcasting-terrestrial (DMB-T), digital multimedia broadcasting-satellite (DMB-S), digital video broadcast-handheld (DVB-H), the data broadcasting system known as media forward link only (MediaFLO®), integrated services digital broadcast-terrestrial (ISDB-T), or other broadcast system. The broadcast receiving module 111 may be configured to be suitable for broadcast systems that provide a broadcast signal as well as the above-mentioned digital broadcast systems. Broadcast signals and/or broadcast-associated information received via the broadcast receiving module 111 may be stored in the memory 160.

The mobile communication module 112 may transmit and receive radio signals to and from at least one of a base station (e.g., access point, Node B, etc.), an external terminal (e.g., other user devices) and a server (or other network entities). Such radio signals may include a voice call signal, a video call signal or various types of data according to text and/or multimedia message transmission and/or reception.

The wireless Internet module 113 supports wireless Internet access for the mobile communication terminal. This module may be internally or externally coupled to the terminal. Here, as the wireless Internet technique, a wireless local area network (WLAN), Wi-Fi, wireless broadband (WiBro), world interoperability for microwave access (WiMAX), high speed downlink packet access (HSDPA), and the like, may be used.

The short-range communication module 114 is a module for supporting short range communications. Some examples of short-range communication technology include Bluetooth™, Radio Frequency Identification (RFID), Infrared Data Association (IrDA), Ultra-WideBand (UWB), and ZigBee™.

The location information module 115 is a module for checking or acquiring a location (or position) of the mobile communication terminal or vehicle in which the mobile communication terminal is located. For example, the location information module 115 may be embodied using a GPS module that receives location information from a plurality of satellites. Here, the location information may include coordinate information represented by latitude and longitude values. For example, the GPS module may measure time and distance with respect to three or more satellites so as to calculate a current location of the mobile terminal 100 according to trigonometry based on the measured time and distances. A method of acquiring distance and time information from three satellites and performing error correction with a single satellite may be used. In particular, the GPS module may acquire time and three-dimensional speed information as well as a latitude, longitude, and altitude from the location information received from the satellites. A Wi-Fi position system and/or hybrid positioning system may be used as the location information module 115.

The A/V input unit 120 is configured to receive an audio or video signal. The A/V input unit 120 may include a camera 121 and a microphone 122. The camera 121 processes image data of still pictures or video obtained by an image capture device in a video capturing mode or an image capturing mode. The processed image frames may be displayed on the display unit 151 (or other visual output device). The image frames processed by the camera 121 may be stored in the memory 160 (or other storage medium) or transmitted via the wireless communication unit 110. Two or more cameras 121 may be provided according to the configuration of the mobile communication terminal.

The microphone 122 may receive sounds (audible data) via a microphone (or the like) in a phone call mode, a recording mode, a voice recognition mode, or other modes, and can process the received sounds into audio data. In implementations using mobile telephone systems, the processed audio data may be converted for output into a format transmittable to a mobile communication base station (or other network entity) via the mobile communication module 112. The microphone 122 may implement various types of noise canceling (or suppression) algorithms to cancel (or suppress) noise or interference generated in the course of receiving and transmitting audio signals.

The user input unit 130 may generate key input data from commands entered by a user to control various operations of the mobile terminal 100. The user input unit 130 allows the user to enter various types of information, and may include a keypad, a dome switch, a touch pad (e.g., a touch sensitive member that detects changes in resistance, pressure, capacitance, etc. due to being contacted) a jog wheel, a jog switch, or other input mechanisms. In particular, when the touch pad is overlaid on the display unit 151 in a layered manner, it may form a touch screen.

The sensing unit 140 detects a current status (or state) of the mobile terminal 100, such as an opened or closed state of the mobile terminal 100, a location of the mobile terminal 100, the presence or absence of user contact with the mobile terminal 100 (i.e., touch inputs), the orientation of the mobile terminal 100, an acceleration or deceleration movement and direction of the mobile terminal 100, or other input mechanisms, so as to generate commands or signals for controlling the operation of the mobile terminal 100. For example, when the mobile terminal 100 is implemented as a slide type mobile phone, the sensing unit 140 may sense whether the slide phone is opened or closed. In addition, the sensing unit 140 can detect whether or not the power supply unit 190 supplies power or whether or not the interface unit 170 is coupled with an external device.

The output unit 150 is configured to provide outputs in a visual, audible, and/or tactile manner (e.g., audio signal, video signal, alarm signal, or vibration signal). The output unit 150 may include the display unit 151, an audio output module 152, an alarm unit 153, a haptic module, and the like.

The display unit 151 may output information processed in the mobile terminal 100. For example, when the mobile terminal 100 is in a phone call mode, the display unit 151 may display a User Interface (UI) or a Graphic User Interface (GUI) associated with a call or other communication (such as text messaging or multimedia file downloading). When the mobile terminal 100 is in a video call mode or image capturing mode, the display unit 151 may display a captured image and/or a received image, a UI or GUI that shows videos or images and functions related thereto.

The display unit 151 may include at least one of a Liquid Crystal Display (LCD), a Thin Film Transistor-LCD (TFT-LCD), an Organic Light Emitting Diode (OLED) display, a flexible display, or a three-dimensional (3D) display. In some implementations, a display of the display unit 151 is configured to be transparent or light-transmissive to allow viewing of the exterior. A transparent display may be, for example, a TOLED (Transparent Organic Light Emitting Diode) display. Through such configuration, the user can view an object positioned at the rear side of the terminal body through the region occupied by the display unit 151 of the terminal body.

The mobile terminal 100 may include two or more display units (or other display means) according to its particular desired functionality. For example, a plurality of display units may be separately or integrally disposed on one surface of the mobile terminal, or may be separately disposed on mutually different surfaces.

When the display unit 151 and a sensor (referred to as a 'touch sensor', hereinafter) for detecting a touch operation are overlaid in a layered manner to form a touch screen, the display unit 151 may function as both an input device and an output device. The touch sensor may, for example, have a form of a touch film, a touch sheet, or a touch pad.

The touch sensor may be configured to convert pressure applied to a particular portion of the display unit 151 or a change in the capacitance or other electrical characteristic generated at a particular portion of the display unit 151 into an electrical input signal. The touch sensor may be configured to detect the pressure when a touch is applied, as well as the touched position and area.

When there is a touch input with respect to the touch sensor, a corresponding signal is transmitted to a touch controller (not shown). The touch controller processes the signals and transmits corresponding data to the controller 180. Accordingly, the controller 180 may recognize which portion of the display unit 151 has been touched.

A proximity sensor 141 may be disposed within or near the touch screen. The proximity sensor 141 is a sensor for detecting the presence or absence of an object relative to a certain detection surface or an object that exists nearby using the force of electromagnetism or infrared rays without a physical contact. Thus, the proximity sensor 141 can have a considerably longer life span than a contact type sensor and can be utilized for various purposes.

Examples of the proximity sensor 141 may include a transmission type photoelectric sensor, a direct reflection type photoelectric sensor, a mirror-reflection type photo sensor, an RF oscillation type proximity sensor, a capacitance type proximity sensor, a magnetic proximity sensor, and an infrared proximity sensor. If the touch screen is a capacitance type touch screen, proximity of the pointer can be detected by a change in electric field according to the proximity of the pointer. In this case, the touch screen may be classified as a proximity sensor.

In the following description, for the sake of brevity, recognition of the pointer positioned to be close to the touch screen will be called a 'proximity touch', while recognition of actual contacting of the pointer on the touch screen will be called a 'contact touch'. In this case, when the pointer is in the state of the proximity touch, it means that the pointer is positioned to correspond vertically to the touch screen.

By employing the proximity sensor 141, a proximity touch and a proximity touch pattern (e.g., a proximity touch distance, a proximity touch speed, a proximity touch time, a proximity touch position, or a proximity touch movement state) can be detected, and information corresponding to the detected proximity touch operation and the proximity touch pattern can be outputted to the touch screen.

The audio output module 152 may convert and output sound from audio data received from the wireless communication unit 110 or stored in the memory 160 in various modes. The modes may include a call signal reception mode, a call mode, a record mode, a voice recognition mode, a broadcast reception mode, or other modes. Also, the audio output module 152 may provide audible outputs related to a particular function performed by the mobile terminal 100 (e.g., a call signal reception sound or a message reception sound). The audio output module 152 may include a speaker, a buzzer, or other sound generating device.

The alarm unit 153 may provide output to inform a user about the occurrence of an event of the mobile terminal 100. Typical events may include receipt of a call, receipt of a message, or received key or touch inputs. In addition to audio or video outputs, the alarm unit 153 may provide outputs in a different manner to inform the user about the occurrence of an event. For example, the alarm unit 153 may provide an output in the form of vibration or other tactile or sensible output. When a call, a message, or some other incoming communication is received, the alarm unit 153 may provide tactile output (i.e., vibration) to inform the user thereof. By providing such tactile outputs, the user can recognize the occurrence of various events even if his mobile phone is in the user's pocket. Output informing about the occurrence of an event may be also provided via the display unit 151 or the audio output module 152. The display unit 151 and the audio output module 152 may be classified as a part of the alarm unit 153.

A haptic module 154 generates various tactile effects the user may feel. A typical example of the tactile effects generated by the haptic module 154 is vibration. The strength and pattern of the haptic module 154 can be controlled. For example, different vibrations may be combined to be outputted or sequentially outputted.

Besides vibration, the haptic module 154 may generate various other tactile effects. The generated effects can include stimulation with a pin arrangement moving vertically with respect to a contact skin, a spray force or suction force of air through a jet orifice or a suction opening, a contact on the skin, a contact of an electrode, electrostatic force, and the sense of cold or warmth using an element that can absorb or generate heat.

The haptic module 154 may be implemented to allow the user to feel a tactile effect through a muscle sensation such as fingers or arm of the user, as well as transferring the tactile effect through a direct contact. Two or more haptic modules 154 may be provided according to the configuration of the mobile terminal 100.

The memory 160 may store software programs used for the processing and controlling operations performed by the controller 180, or may temporarily store data (e.g., a phonebook, messages, still images, or video) that are inputted or outputted. In addition, the memory 160 may store data regarding various patterns of vibrations and audio signals outputted when a touch is inputted to the touch screen.

The memory 160 can be implemented using any type of suitable storage medium, such as, for example, a Flash memory, a hard disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, and an optical disk. Also, the mobile terminal 100 may be operated in relation to a web storage device that performs the storage function of the memory 160 over the Internet.

The interface unit 170 serves as an interface with every external device connected with the mobile terminal 100. For example, the external devices may transmit data to external devices, receive and transmit power to each element of the mobile terminal 100, or transmit internal data of the mobile terminal 100 to an external device. For example, the interface unit 170 may include wired or wireless headset ports, external power supply ports, wired or wireless data ports, memory card ports, ports for connecting a device having an identification module, audio input/output (I/O) ports, video I/O ports, or earphone ports.

The identification module may be a chip that stores various information for authenticating the authority of using the mobile terminal 100. This information may include a user identity module (UIM), a subscriber identity module (SIM) a universal subscriber identity module (USIM), or other information. In addition, the device having the identification module (referred to as 'identifying device', hereinafter) may take the form of a smart card. Accordingly, the identifying device may be connected with the mobile terminal 100 via a port.

When the mobile terminal 100 is connected with an external cradle, the interface unit 170 may serve as a passage to allow power from the cradle to be supplied therethrough to the mobile terminal 100 or may serve as a passage to allow various command signals inputted by the user from the cradle to be transferred to the mobile terminal therethrough. Various command signals or power inputted from the cradle may operate as signals for recognizing that the mobile terminal is properly mounted on the cradle.

The controller 180 typically controls the general operations of the mobile terminal. For example, the controller 180 performs controlling and processing associated with voice calls, data communications, video calls, and other operation. The controller 180 may include a multimedia module 181 for reproducing multimedia data. The multimedia module 181 may be configured within the controller 180 or may be configured to be separated from the controller 180. Also, the controller 180 may perform a pattern recognition processing to recognize a handwriting input or a picture drawing input performed on the touch screen as characters or images, respectively. The power supply unit 190 receives external power or internal power and supplies appropriate power required for operating respective elements and components under the control of the controller 180.

Various embodiments described herein may be implemented in a computer-readable medium using, for example, software, hardware, or a combination thereof.

For hardware implementations, the techniques described below may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic units designed to perform the functions described herein. In some implementations, functionality may be implemented by the controller 180 itself.

For software implementations, the techniques described below may be implemented by separate software modules. Each software module may perform one or more functions or operations described herein. Software codes can be implemented by a software application written in any suitable programming language. The software codes may be stored in the memory 160 and executed by the controller 180. In addition, a navigation session 300 applied to the mobile terminal 100 provides a general navigation function.

Based on the receipt of input or occurrence of an event with respect to a plurality of selected phone numbers or menu items, the controller 180 may be used to reset the size of displayed phone numbers or menu items based on relationship scores of the phone numbers or menu items, and to display each of the reset phone number or menu item.

Figure 2:
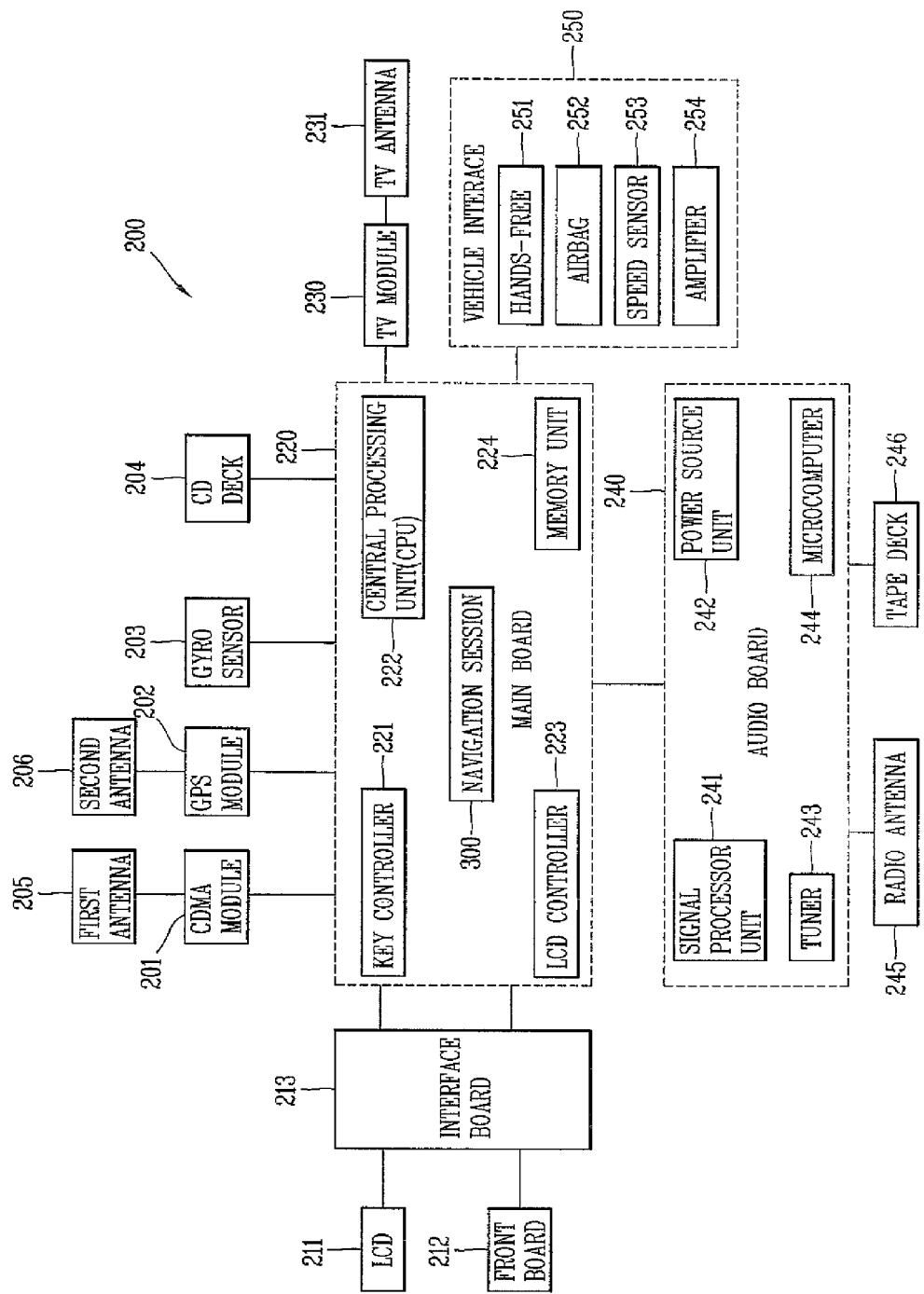
FIG. 2 is a schematic block diagram showing a configuration of a telematics terminal.

FIG. 2 is a block diagram showing a configuration of a telematics terminal 200. The telematics terminal 200 illustrates one exemplary configuration of a telematics terminal that may be used to carryout the functionality described in more detail below. In various implementations, a different configuration of a telematics terminal with other components may be used.

Referring to FIG. 2, the telematics terminal 200 may include a main board 220. The main board 220 includes a key controller 221 for controlling a variety of key signals, a central processing unit (CPU) 222 for controlling overall operation of the telematics terminal 200, an LCD controller 223 for controlling an LCD, and a memory unit 224 for storing various kinds of information. In particular, the memory unit 224 stores map information (map data) for displaying vehicle guidance information (e.g., road guidance information for the user while driving or not driving) on a map of the display unit (e.g., LCD 211). In addition, the memory unit 224 stores an algorithm for controlling traffic information collection for enabling an input of traffic information depending on a road condition in which a vehicle is currently traveling.

The main board 220 may include a communication module 201 provided with a uniquely given device number. The communication module 201 may be configured to perform a voice call and data transmission and/or reception through a mobile terminal built in a vehicle and may include a GPS module 202 for receiving a GPS signal to guide a position of a vehicle, track a traveling route from a depart point to an arrival point, and for generating current position data of a vehicle based on the received GPS signal or transmitting traffic information collected by a user as a GPS signal. The communication module 201 may also include a gyro sensor 203 for sensing a running direction of the vehicle, a CD deck 204 for reproducing a signal recorded on a compact disk (CD), and other modules.

The communication module 201 and the GPS module 202 transmit and/or receive signals through a first antenna 205 and a second antenna 206, respectively. The main board 220 is connected to a TV module 230 for receiving a broadcast signal via a broadcast signal antenna (or TV antenna). Also, the main board 220 is connected to an LCD 211 controlled by the LCD controller 223 via an interface board 213.

The LCD 211 processes a broadcasting signal received through the TV module 230, and then displays the processed broadcasting signal, in the form of a video signal, on the LCD 211 via the interface board 213 under control of the LCD controller 223. In addition, the LCD 211 outputs an audio signal through an amplifier 254 under control of an audio board 240 and displays each kind of video signal or text signal based on control signals of the LCD controller 223. As discussed above, the LCD 211 may also be configured to receive an input from a user via a touch screen.

In addition, the main board 220 is connected to a front board 212 controlled by the key controller 221 via the interface board 213. The front board 212 configures buttons (or keys) and menus for enabling an input of a variety of key signals, and provides a key signal corresponding to the key (or button) selected by the user to the main board 220. The front board 212 may be provided with a menu key for allowing a direct input of traffic information, and the menu key may be configured to be controlled by the key controller 221.

The audio board 240 is connected to the main board 220, and processes a variety of audio signals. The audio board 240 may include a microcomputer 244 for controlling the audio board 240, a tuner 243 for receiving a radio signal through an antenna (or radio antenna) 245, a power source unit 242 for supplying power to the microcomputer 244, and a signal processing unit 241 for processing a variety of voice signals. The audio board 240 is connected to a radio antenna 245 for receiving radio signals, and a tape deck 246 for reproducing an audio tape. In addition, the audio board 240 is connected to an amplifier 254 for outputting audio signals that are processed in the audio board 240.

The amplifier 254 is connected to a vehicle interface 250. That is, the main board 220 and the audio board 240 are connected to the vehicle interface 250. A hands-free unit 251 for inputting an audio signal without the user having to use their hands to input information, an airbag 252 for providing passenger's safety, and a speed sensor 253 for sensing a vehicle speed are also included in the vehicle interface 250. In addition, the speed sensor 253 calculates a vehicle speed, and provides information relating to the calculated vehicle speed to the CPU 222. The function of the navigation session 300 applied to the telematics terminal 200 can include general navigation functions, such as providing driving directions to a user.

Based on the receipt of input or occurrence of an event with respect to a plurality of selected phone numbers or menu items, the CPU 222 may be used to reset the size of a displayed phone number or menu item based on the relationship scores of the phone numbers and the menu items, and to provide control to display the each phone number or menu item.

In the following description, the configuration of a mobile terminal 400 is described with reference to FIG. 3. However, the first mobile terminal 400, can be applicable to the telematics terminal 200 as well as to the mobile terminal 100. Also, the mobile terminal 400 may be applied to various terminals, such as a smart phone, a portable terminal, a mobile terminal, a personal digital assistant (PDA), a notebook computer, a Wibro terminal, an Internet protocol Television (IPTV) terminal, a telematics terminal, a navigation terminal, an audio video navigation (AVN) terminal, a television, an audio/video (A/V) system, or a home theater system.

Figure 3:
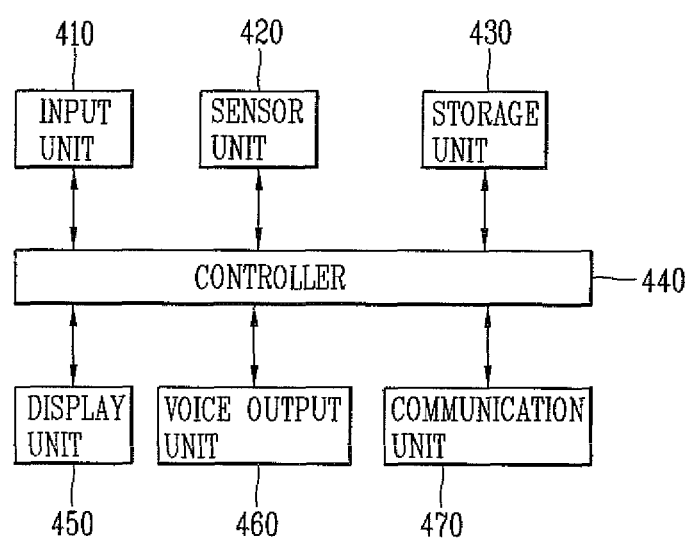
FIG. 3 is a schematic block diagram showing a configuration of another mobile terminal.

FIG. 3 is a schematic block diagram showing the configuration of a mobile terminal. As shown in FIG. 3, the mobile terminal 400 includes an input unit 410, a sensor unit 420, a storage unit 430, a controller 440, a display unit 450, a voice output unit 460, and a communication unit 470.

The input unit 410 may receive input by the user (e.g., a button manipulation) or a command or a control signal according to a manipulation such as a touch or scroll a displayed screen image. Also, the input unit 410 may allow the user to select a desired function or receive information, and may include various devices such as a keypad, a touch screen, a jog shuttle, a microphone, a mouse, a stylus, or a touch pen. In addition, the input unit 410 can include a microphone (not shown) and/or a camera (not shown) and may receive voice information and/or video information (or image information) via the microphone and/or a camera.

The sensor unit 420 is provided at a certain position of the mobile terminal 400, senses the movement of the mobile terminal 400, and can include a motion recognition sensor. Here, the motion recognition sensor can include sensors, such as a sensor for recognizing a movement or a position of an object, a geomagnetism sensor, an acceleration sensor, a gyro sensor, an initial sensor, an altimeter, a vibration sensor, or other sensors related to motion recognition. In addition, the sensor unit 402 may detect information about a movement of the mobile terminal 400, for example, a tilt direction of the mobile terminal 400, a tilt angle and/or a tilting speed of the mobile terminal 400, a vibration direction of vertical, horizontal or diagonal direction, and/or vibration number of the mobile terminal 400. Such, detected information may be digitalized through an analog to digital signal conversion process, and the digitalized information can be input to the controller 440.

The storage unit 430 can store various user interfaces (UIs) and/or graphic UIs (GUIs). Also, the storage unit 430 can store data and programs (e.g., a widget program or gadget program) which may be used by the mobile terminal 400, including phone numbers and images or visual designs corresponding to the phone numbers. In addition, the storage unit 430 can store information detected by the sensor unit 420, such as a tilt direction, tilt angle, tilting speed, vibration direction, or vibration number of the mobile terminal. Moreover, the storage unit 430 can store data transmitted from another mobile terminal or an information providing center connected via wireline or wireless communication.

The controller 440 executes a general control function of the mobile terminal 400. Also, when an event occurs, the controller 440 can reset the size or form of images based on a relationship scores of the images (e.g., icons or menu items) displayed on the display unit 450. The controller 440 also can enable display of the reconfigured images on the display unit 450. In this case, the event may one or more phone numbers being selected to generate an image, the mobile terminal 400 is wobbled in a certain direction a certain number of times, or a pre-set button is selected.

Also, the controller 440 can generate a representative image based on the plurality of reconfigured images and can display the generated representative image on the display unit 450. In this case, the representative image may be contents used in an application program including a widget function or a gadget function. In addition, when one of the plurality of reconfigured images (or the representative image) is selected, the controller 440 can display one or more menus previously stored (or previously set) corresponding to the selected image on the display unit 450. When one of the displayed menus is selected, the controller 440 can perform a function corresponding to the selected menu and display results of performing the function on the display unit 450.

The display unit 450 may display various contents, such as menus screens by using a UI and/or GUI included in the storage unit 430 under the control of the controller 440. Here, the contents displayed on the display unit 450 may include menu screen images including various text or image data (e.g., map data), icons, list menus, or combo-boxes. The display unit 450 may be a touch screen. The display unit 450 may display a plurality of images whose size and form have been reset under the control of the controller 440. Also, the display unit 450 may display the generated representative image under the control of the controller 440. In addition, the display unit 450 may display one or more of menus previously stored according to an arbitrary image in a pop-up manner under the control of the controller 440.

The voice output unit 460 may output voice information included in a signal which has been processed by the controller 440. Here, the voice output unit 460 may be a speaker. The voice output unit 460 may output a guidance voice generated by the controller 440. The communication unit 470 may include a wireless Internet module or a short-range communication module. Here, the wireless Internet module may include WLAN, Wi-Fi, WiBro, WiMAX, or HSDPA, and the short-range communication module may include Bluetooth™, RFID, infrared communication, UWB, ZigBee, or another form of communication.

The following description references processes for controlling mobile terminals according to various implementations. Although the process described below reference elements discussed above, this referencing is exemplary. Other elements may be used in conjunction with carrying out the processes described below or portions thereof.

Figure 5A:
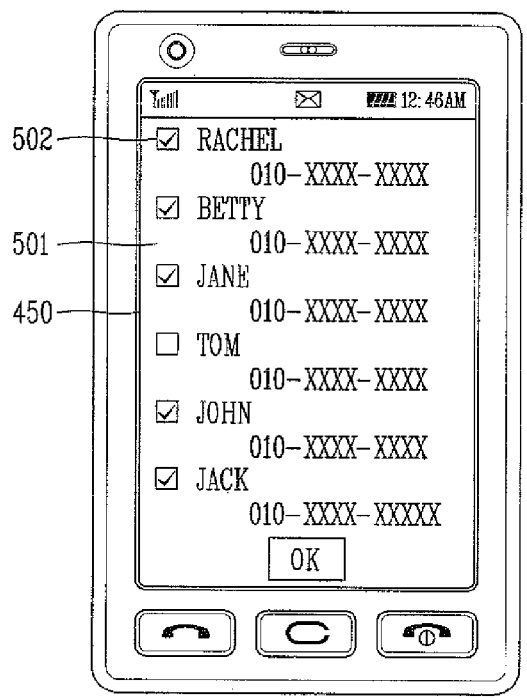
FIGS. 5A to 5L are illustrate display screens of a display unit.

FIG. 4 is a flow chart of a first process for controlling a mobile terminal. First, phone numbers are selected (S110). In particular, the controller 440 displays a plurality of phone numbers included in a phone book stored in a storage unit 430 on the display unit 450 and receives one or more selected phone numbers to be used for generating a representative image among the plurality of displayed phone numbers. For example, as shown in FIG. 5A, five phone numbers corresponding to Rachael, Betty, Jane, John, and Jack may be selected (502) by a user's input (or user selection) from among the plurality of phone numbers (including Rachael, Betty, Jane, Tom, John, and Jack) (501) displayed on the display unit 450.

Next, images corresponding to selected phone numbers are extracted (S 120). In particular, the controller 440 extracts stored images corresponding to one or more of the selected phone numbers from a plurality of images stored in the storage unit 430. In this case, the stored images corresponding to the one or more of the selected phone numbers may be photos (or images) previously designated as corresponding to each phone number, or may be one of an arbitrary image stored in the storage unit 430, an icon, and a clip art. Namely, if there is a previously designated photo image corresponding to the arbitrary phone number, the controller 440 may use the corresponding photo image, while if there is no previously designated photo to image corresponding to the arbitrary phone number, the controller 440 may use one of an image stored in the storage unit 430, an icon, and a clip art.

Figure 5B:
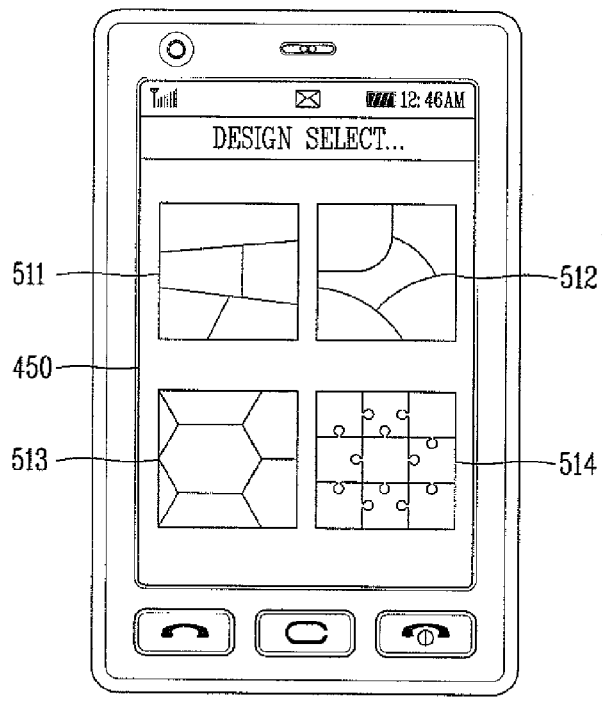

Thereafter, a design is selected (S130). In particular, as shown in FIG. 5B, the controller 440 displays a plurality of designs stored in the storage unit 430 on the display unit 450 and receives a selected one 511 of a plurality of the displayed designs. In various implementation, the plurality of designs may have various types, such as a mesh type 511, a form made in curved lines 512, a honeycomb type 513, a puzzle type 514, or a combination thereof. Also, the controller 440 may randomly select one of the plurality of designs stored in the storage unit 430.

The selected phone numbers are then allocated to a plurality of regions included in the design (S140). In particular, the controller 440 can allocate the one or more of the selected phone numbers or previously stored images corresponding to the one or more of the selected phone numbers to a plurality of regions of the selected particular design. In this case, in allocating the one or more of the phone numbers to the plurality of regions of the design, each phone number may be allocated to a certain particular region directly or randomly according to a user selection. Namely, the controller 440 may directly or randomly set regions on the design in which the images corresponding to the respective phone numbers are to be positioned.

Figure 5C:
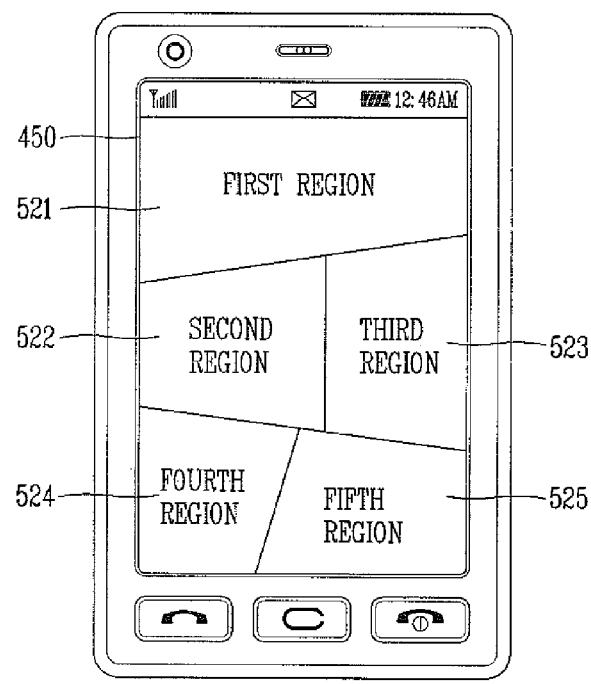

For example, as shown in FIG. 5C, if the selected particular design 511 includes first to fifth regions 521, 522, 523, 524, 525 and the selected phone numbers correspond to Rachael, Betty, Jane, John, and Jack, the controller 440 allocates the phone number of Rachael to the first region 521, the phone number of Betty to the second region 522, the phone number of Jane to the third region 523, the phone number of John to the fourth region 524, and the phone number of Jack to the fifth region 525.

The region size is adjusted based on a relationship score (S150). In particular, the controller 440 sets or adjusts the size of each region based on relationship scores corresponding to the one or more of the selected phone numbers. Here, the relationship scores refer to scores which have been calculated based on one or more of the most recently updated relationship score with respect to a certain phone number, the use frequency number (including the number of voice, text, or data communication), schedule information in relation to the corresponding number, whether or not an event has occurred in a previous stage, user preference information, or other relational aspects. Namely, the controller 440 sets the size of each region based on the relationship scores which have been calculated at pre-set time intervals or in real time with respect to the one or more of the selected phone numbers.

For example, as shown in Table 1 below, when the relationship scores of the phone numbers of Rachael, Betty, Jane, John, and Jack are calculated as 95, 110, 50, 30, and 65, the regions may be adjusted to be 27%, 31%, 14%, 9% and 19% in their size according to the proportion of the relationship scores of the five phone numbers. In addition, a process of rounding off, quantization, or another approximation function may be performed on the respective calculated region sizes to finalize the calculated region sizes. Namely, the region sizes of 27%, 31%, 14%, 9% and 19% may be finalized into region sizes of 25%, 30%, 15%, 10%, and 20%.

TABLE 1

|  | Rachael | Betty | Jane | John | Jack |
| --- | --- | --- | --- | --- | --- |
| Relationship score | 95 | 110 | 50 | 30 | 65 |
| Score proportion (100%) | 27% | 31% | 14% | 9% | 19% |
| Final region (100%) | 25% | 30% | 15% | 10% | 20% |

For another example, as shown in Table 2 below, when relationship scores of the phone numbers of Rachael, Betty, Jane, John, jack are calculated as 95, 110, 50, 30 and 65, a basic allocation size (e.g., 6%) is set for each region, and the size of 70% of the entire region, namely, a remaining region, can be adjusted according to the proportion of the relationship scores of the phone numbers. Namely, each region is allocated with sizes of 19%, 22%, 10%, 6%, and 13% according to the proportion of the relationship scores of the five phone numbers, to which 6%, the basic allocation size, is added to obtain the region sizes of 25%, 28%, 16%, 12%, and 19%. In addition, the process of rounding off, quantization, or another approximation function may be performed on the respective calculated region sizes to finalize the calculated region sizes. Namely, the calculated region sizes of 25%, 28%, 16%, 12% and 19% may be finalized into region sizes of 25%, 30%, 15%, 10%, and 20%.

TABLE 2

|  | Rachael | Betty | Jane | John | Jack |
| --- | --- | --- | --- | --- | --- |
| Relationship score | 95 | 110 | 50 | 30 | 65 |
| Basic allocation (30%) | 6% | 6% | 6% | 6% | 6% |
| Score proportion (70%) | 19% | 22% | 10% | 6% | 13% |
| Sum (100%) | 25% | 28% | 16% | 12% | 19% |
| Final region (100%) | 25% | 30% | 15% | 10% | 20% |

Figure 5D:
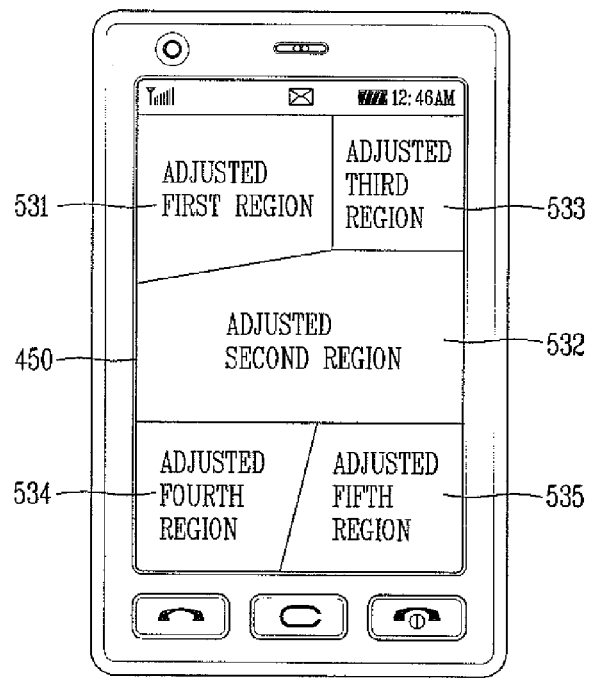
Figure 5E:
Figure 5F:
Figure 5G:
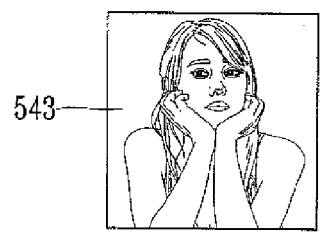
Figure 5H:
Figure 5I:
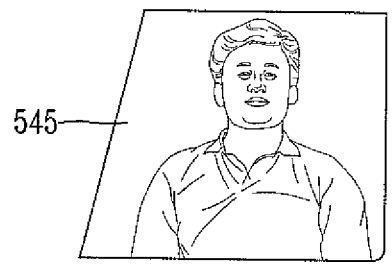

The controller 440 may set each size of the allocated regions 531, 532, 533, 534, and 535 based on the relationship score of each phone number as shown in FIG. 5D with respect to the first to fifth regions as shown in FIG. 5C.

Thereafter, the size and shape of images are based on the adjusted region size and shape (S160). In particular, the controller 440 sets the size and shape of images corresponding to each region based on the size and shape of each of the set regions. Namely, the controller 440 sets the size and shape of each image such that each image corresponds to each region.

For example, the controller 440 sets the size and shape of the stored first to fifth images which have been extracted correspondingly according to the phone numbers of Rachael, Betty, Jane, John, and Jack as shown in FIGS. 5E to 5I 541, 542, 543, 544, and 545, based on the size and shape of the first to fifth regions 531, 532, 533, 534, and 535 each corresponding to the phone numbers of Rachael, Betty, Jane, John, and Jack as shown in FIG. 5D.

Figure 5J:
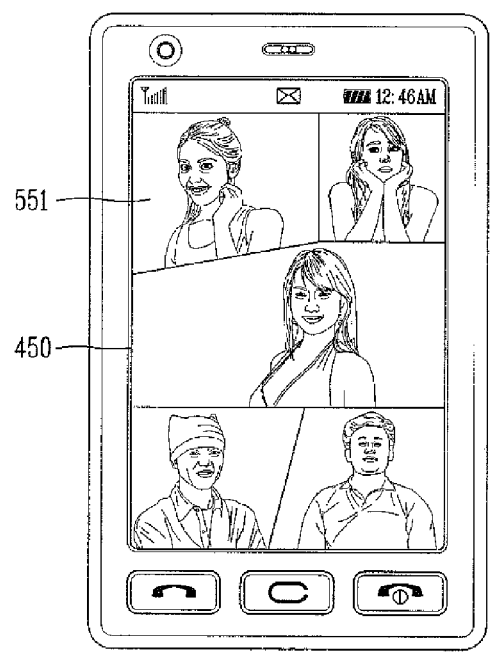

Next, a representative image is generated based on the set images (S170). In particular, the controller 440 generates a representative image based on the one or more of the set images and displays the generated representative image on the display unit 450. In this case, the generated representative image may be contents used in an application program including a widget function or gadget function. For example, as shown in FIG. 5J, the controller 440 may generate a single representative image 551 based on the first to fifth images 541, 542, 543, 544, and 545 which correspond to the phone numbers of Rachael, Betty, Jane, John, and Jack and have been set to correspond to the adjusted size and form of each region, and display the generated representative image 551 on the display unit 450.

Figure 5K:
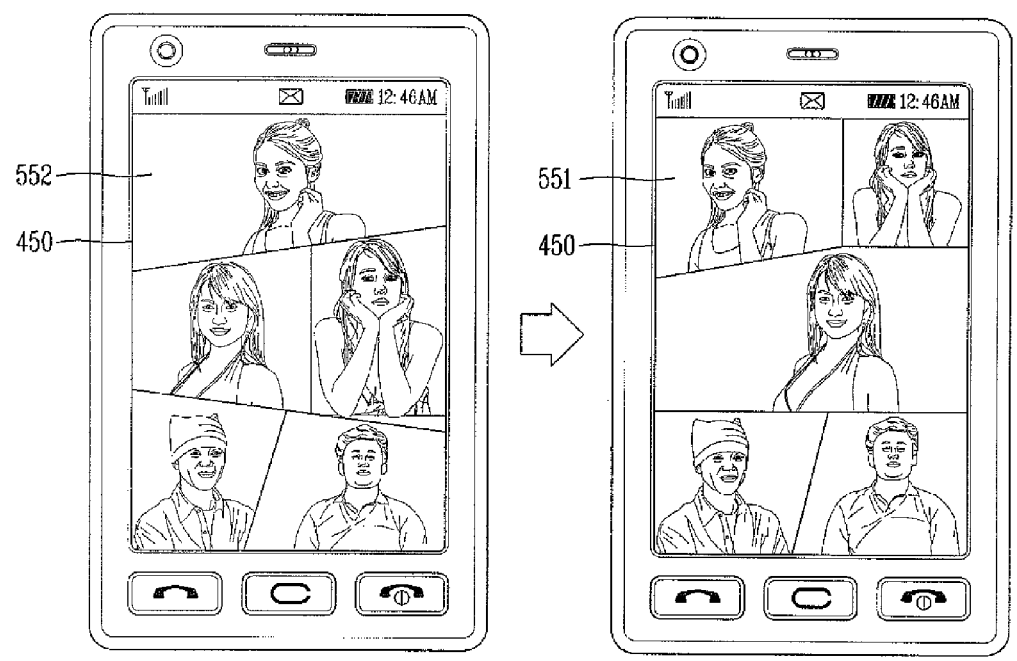

Also, when a previous representative image is being displayed on the display unit 450, the controller 440 may update the previously representative image displayed on the display unit 450 with the generated new representative image. For example, as shown in FIG. 5K, the controller 440 may update the previous representative image 552 displayed on the display unit 450 with the generated new representative image 551. In addition, the controller 440 may display one or more set images on the display unit 450 such that they correspond to the size and shape of each region. Namely, the controller 440 may display the one or more set images on the display unit 450, rather than generating the representative image.

Figure 5L:
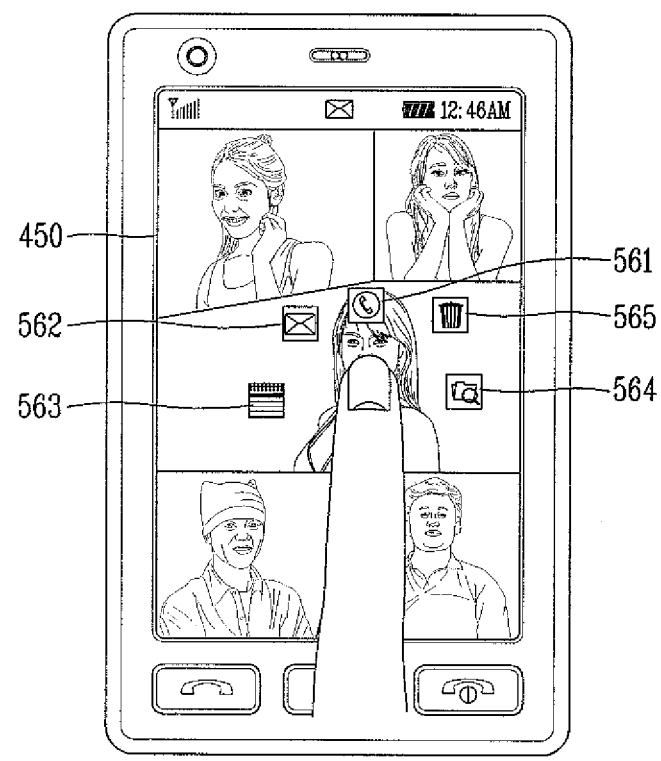

Thereafter, when an image includes in the representative images is selected, a stored menu corresponding to the selected image is displayed (SP180). In particular, when one of one or more of the images included in the generated representative image is selected, the controller 440 displays one or more of previously stored menus on the display unit 450 according to the selected image. For example, as shown in FIG. 5L, when the image (542 in FIG. 5F) positioned at the second region among the displayed representative images 551, the controller 440 displays one or more of a call menu 561, a text message menu 562, an edit menu 563, an image change menu 564, and a delete menu 565 at a certain region of the selected image in a pop-up manner.

Also, when any one of the one or more of the images included in the generated representative image is selected, the controller 440 may display the entirety or a portion of the region corresponding to the selected image among the representative image. The region corresponding to the selected image may be displayed as a color image while the region corresponding to the other remaining images may be displayed as a black and white image.

Finally, when a menu is selected, the function corresponding to the selected menu is performed (SP190). In particular, when any one of the one or more of displayed menus is selected, the controller 440 performs a function corresponding to the selected menu. For example, as shown in FIG. 5L, when the call menu 561 is selected, the controller 440 performs communication connection with the phone number of Jane corresponding to the image of the second region.

In this manner, when a single representative image is generated, the size of the regions occupied by each phone number can be set in the single representative image in consideration of the relationship scores (including user preference) of each phone number, so the representative image reflecting the relationship scores (including user preference) can be generated.

Figure 6:
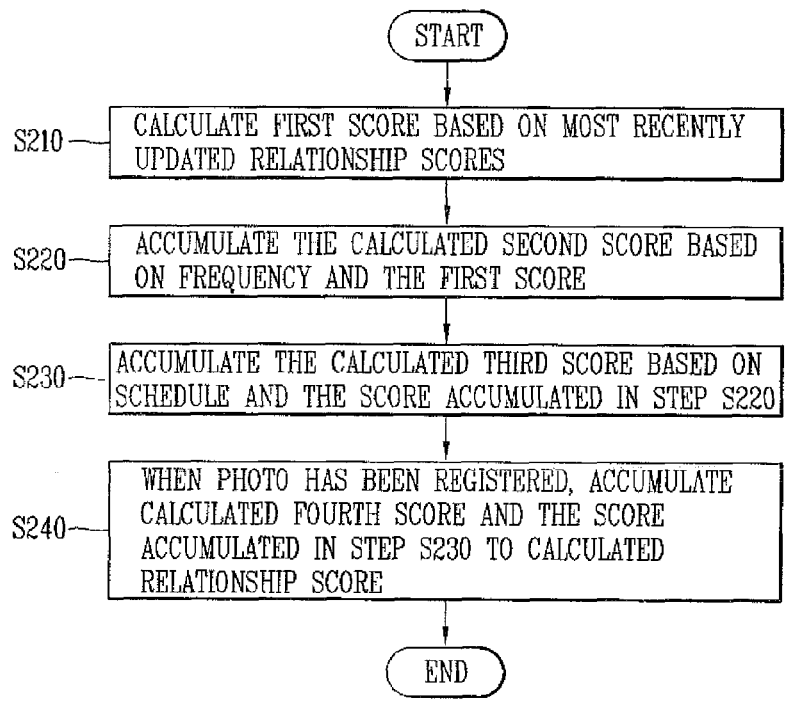
FIG. 6 is a flow chart of a process for calculating a relationship score.

FIG. 6 is a flow chart of a process for calculating a relationship score. In the process, a first score is calculated based on the most recently updated relationship scores (S210). In particular, the controller 440 calculates a first score by reducing the most recently updated relationship scores by a pre-set particular rate with respect to the plurality of phone numbers stored in the storage unit 430.

For example, if each update time is 0 o'clock, 6 o'clock, 12 o'clock, and 18 o'clock at six pre-set time intervals and relationship scores with respect to the updating at 18 o'clock is calculated (in this case, various information accumulated between 12 o'clock and 18 o'clock is used), the controller 440 calculates 40 scores, 80 scores and 8 scores by reducing the respective relationship scores (e.g., 50 scores, 100 scores, and 10 scores with respect to the phone numbers of Rachael, Betty and Jane) updated at previous 12 o'clock with respect to the plurality of phone numbers (e.g., the phone numbers of Rachael, Betty and Jane) by a pre-set particular rate (e.g., 80%).

Thereafter, a calculated second score is accumulated based on use frequency and the first score (S220). The term "accumulation" is used in this description to refer to mathematically combining values, such as for example, the use of summation. In particular, the controller 440 calculates a second score based on the use frequency (e.g., the number of transmitted and received characters, the number of transmitted and received e-mails, or the number of calls) of each of the plurality of phone numbers. Also, the controller 440 accumulates the calculated second score and the first score which has been calculated in the previous operation.

For example, if the pre-set scores are 1, 3, and 5 with respect to the number of characters, the number of e-mails, and the number of calls, if the number of characters transmitted and received between the mobile terminal 400 and the phone number of Rachael with respect to the phone number of Rachael is 9, if the number of transmitted and received e-mails is 2, and if the number of calls is two times, then, the controller 440 multiples the number of transmitted and received characters, the number of e-mails, and the number of calls to the pre-set score, accumulates them, and calculates a score with respect to the phone number of Rachael. Namely, 25 scores (=1*9+3*2+5*2) are calculated. Thereafter, the controller 440 adds 40 scores calculated in the previous operation and the calculated 25 scores to obtain 65 scores.

Then, a calculated third score is accumulated based on schedule and the accumulated score of the previous operation (S230). In particular, the controller 440 calculates a third score based on schedule information (e.g., a schedule management function or diary) with respect to the plurality of phone numbers stored in the storage unit 430, and accumulates the calculated third score and the accumulated score which has been calculated in the previous operation.

For example, when there is a schedule related to the phone number of Rachael between 18 o'clock and 24 o'clock according to updating of 18 o'clock (namely, when an appointment has been reserved at 20 o'clock with the phone number of Rachael in schedule information stored in the storage unit 430), the controller 440 gives 20 scores, a certain pre-set score, to the phone number of Rachael. The controller 440 adds 65 scores which has been calculated from the previous operation and the given 20 scores to obtain 85 scores.

Finally, when a photo has been registered, a relationship score is calculated based on accumulating a calculated fourth score and the accumulated score of the previous operation (S240). In particular, when photo images of particular people included in the plurality of phone numbers are registered within the late pre-set time period during which information has been accumulated (namely, when photo images are registered for each phone number through face recognition or such that the user designates the photo images correspondingly according to the particular phone numbers), the controller 440 gives a certain pre-set fourth score to the corresponding phone numbers, and accumulates the given fourth score and the score which has been calculated in the previous operation. For example, when a certain photo image has been registered for the phone number of Rachael between 12 o'clock and 18 o'clock, the controller 440 gives 10 score, a pre-set score, to the phone number of Rachael and accumulates the given 10 scores and 85 scores calculated in the previous operation to obtain 95 scores.

In this manner, the controller 440 applies a pre-set score to each of the phone numbers stored in the storage unit 430 according to the most recently updated relationship score, the use frequency, schedule information, and whether or not an event has occurred in a previous stage (including photo taking) and accumulates the applied scores to obtain the relationship score of each of the phone numbers. In addition, besides the most recently updated relationship score, the controller 440 may calculate a relationship score of each of the phone numbers by using user preference information and the like.

Also, besides the pre-set time interval, the controller 440 may calculate a relationship score of each of the plurality of phone numbers stored in the storage unit 430. Namely, when a pre-set button is clicked, when the mobile terminal 400 is wobbled by more than a certain number of times in a pre-set direction, or when one or more phone numbers are selected to generate a representative image, the controller 440 may calculate a relationship score of each of the plurality of the phone numbers (or one or more of selected phone numbers).

Figure 7:
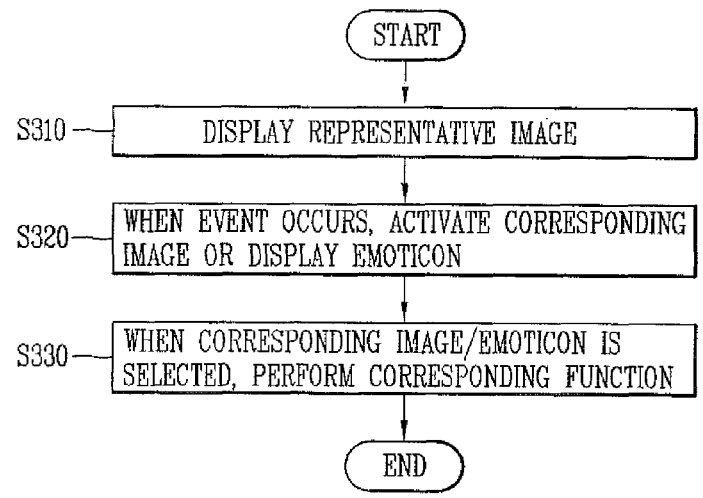
FIG. 7 is a flow chart of a second process for controlling a mobile terminal.

FIG. 7 is a flow chart of a second process for controlling a mobile terminal. In the process, a representative image is displayed (S310). In particular, the controller 440 displays a representative image which has been generated based on one or more phone numbers, images corresponding to the phone numbers, and relationship scores of the phone numbers (or relationship scores of the images), on the display unit 450. In this case, the representative image may be contents used in an application program including a widget function or a gadget function.

When an event occurs, an image or display emoticon corresponding to the event is activated (S320). In particular, when an event occurs (e.g., a text message or a call connection signal is transmitted from a terminal corresponding to a phone number of one of one or more of images included in the representative image), the controller 440 activates a portion (or the entire region) of the corresponding image included in the representative image or displays a pre-set emoticon (or an image) corresponding to the event at a portion of the corresponding image.

Figure 8A:
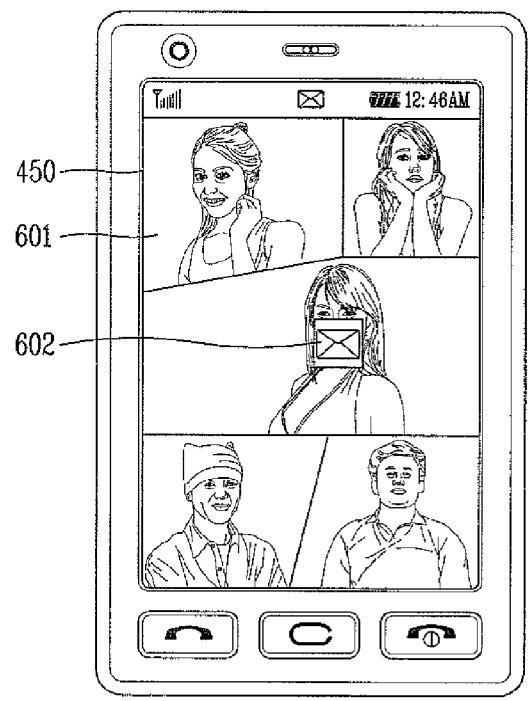
FIGS. 8A and 8B are overviews of display screens of a display unit.
Figure 8B:
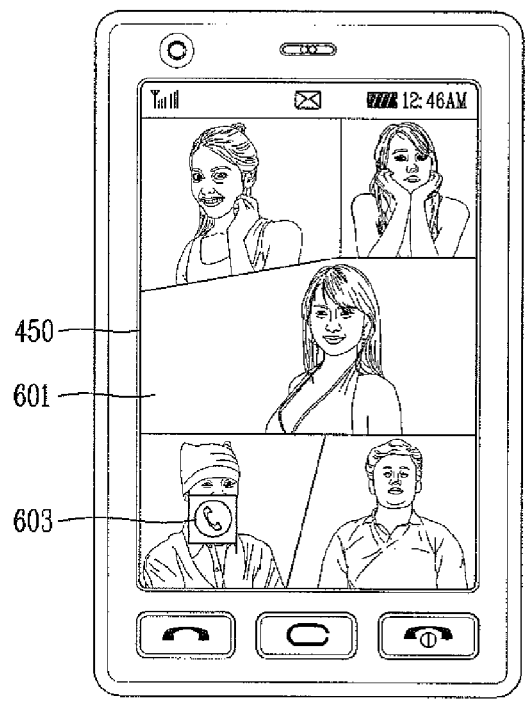

For example, when a text message is transmitted from Jane among the representative image 601 illustrated in FIG. 8A, the controller 440 displays an emoticon 602 corresponding to the text message at a portion of the image of Jane included in the representative image 601. Also, the controller 440 may provide a special effect (e.g., an activation or deactivation function) of glittering the edges of a portion or the entire region of the corresponding image along with the displaying of the emoticon. For another example, when a call is received from John among the representative image 601 illustrated in FIG. 8B, the controller 440 displays an emoticon 603 corresponding to a call at a portion of the image of John included in the representative image 601. Also, in this case, the controller 440 may provide a special effect of glittering the edges of the portion or the entire region of the corresponding image along with the displaying of the emoticon.

When an image or emoticon is selected, a function corresponding to the selected image or emoticon is performed (S330). In particular, when a corresponding image for which the event has occurred is selected, or when a corresponding emoticon is selected, the controller 440 performs (executes) a pre-set function corresponding to the emoticon. For example, in a state that the emoticon 602 corresponding to the text message is displayed at a portion of the image of Jane illustrated in FIG. 8A, if the corresponding image or the corresponding emoticon 602 is selected according to a user's input, the controller 440 displays the received text message on the display unit 450. For another example, in a state that the emoticon 603 corresponding to a call is displayed at a portion of the image of John illustrated in FIG. 8B, if the corresponding image or the corresponding emoticon 603 is selected according to a user's input, the controller 440 performs a call function with the terminal of John.

Figure 9:
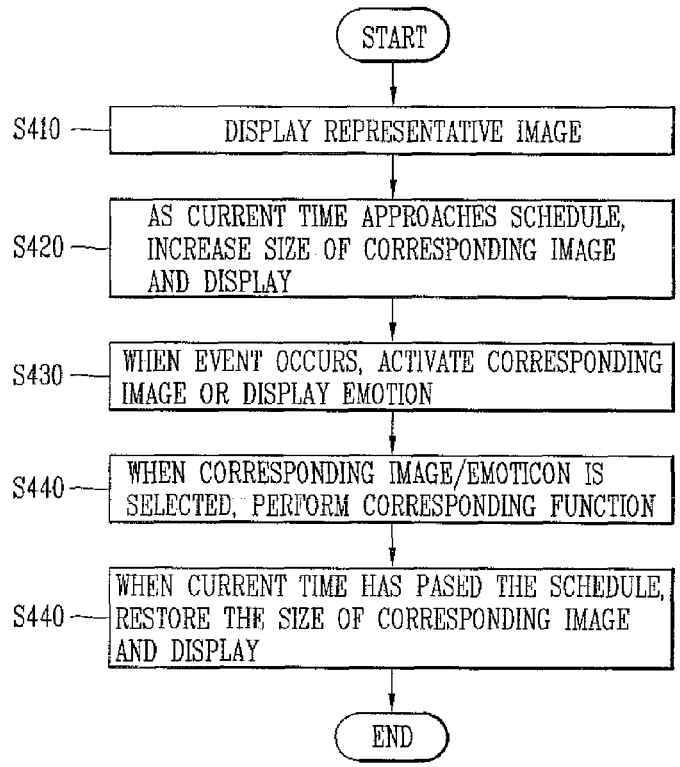
FIG. 9 is a flow chart of a third process for controlling a mobile terminal.

FIG. 9 is a flow chart of a third process for controlling a mobile terminal. First, a representative image is displayed (S410). In particular, the controller 440 displays a representative image generated based on one or more phone numbers, images corresponding to the phone numbers, and relationship scores of the phone numbers on the display unit 450. In this case, the representative image may be contents used in an application program including a widget function or a gadget function.

As the current time approaches a scheduled time, the size of a corresponding image and display is increased (S420). In particular, when the difference between a current time and time information included in schedule information based on the previously stored schedule information (or information stored in a diary) corresponding to one or more of the images included in the representative image is within a certain range (e.g., a plurality of certain ranges), the controller 440 activates a portion (or the entire region) of the corresponding image included in the representative image or increases the region of the corresponding image by a pre-set rate over the entire region of the representative image.

Also, when the difference between a current time and time information included in schedule information based on the previously stored schedule information corresponding to one or more of the images included in the representative image is within a certain range (including a plurality of certain ranges), the controller 440 generates a guidance voice and outputs it via the voice output unit 460. For example, in the representative image 601 illustrated in FIG. 8A, if a current time is 14 o'clock and an appointment schedule with Rachael at 18 o'clock has been stored in the storage unit 430, the controller 440 checks the current time and the appointment time stored in the storage unit 430. If the difference (e.g., four hours) between the current time and the appointment time stored in the storage unit 430 is between four hours (a pre-set first time) and two hours (a pre-set second time) the controller 440 increases or enlarges the region of the corresponding image included in the representative image by 5% (a pre-set rate), reduces or contracts the regions of the other remaining images of the entire region of the representative image by a certain rate, and then displays the changed representative image on the display unit 450.

Thereafter, if a current time is 16 o'clock and an appointment schedule with Rachael at 18 o'clock has been stored in the storage unit 430, the controller 440 checks 16 o'clock, the current time, and the appointment time (e.g., 18 o'clock) stored in the storage unit 430. If the difference (e.g., two hours) between the current time (e.g., 16 o'clock) and the appointment time stored in the storage unit 430 is between two hours (a pre-set second time) and one hour (a pre-set third time), the controller 440 increases the region of the corresponding image included in the changed representative image by 5% (a pre-set rate), reduces the regions of the other remaining images of the entire region of the changed representative image by a certain rate, and then displays the re-changed representative image on the display unit 450.

When an event occurs, an image or display emoticon corresponding to the event is activated (S430). In particular, when one of the images displayed on the display unit 450 is selected, as shown in FIG. 5K, the controller 440 displays one or more menus (e.g., icons or emoticons) previously stored as corresponding to the selected image in a pop-up manner on the display unit 450. Thereafter, when an image or emoticon is selected, a function corresponding to the selected image or emoticon is performed (S440). In particular, when one of the displayed menus is selected, the controller 440 performs a function corresponding to the selected menu.

When the current time has passed the scheduled time, the size of the corresponding image and display is restored (S450). In particular, it is checked that the time included in the schedule information of the corresponding image included in the representative image has lapsed based on a current time, the controller 440 displays a pre-set initial representative image on the display unit 450. Namely, if the time included in the schedule information of the corresponding image has lapsed based on the current time, the controller 440 restores the increased size of the corresponding image to its original size (i.e., the size of the corresponding image displayed in step S410) and displays the restored image on the display unit 450.

In this manner, the controller 440 checks one or more images included in the representative image and the schedule information stored in the storage unit 430, and if a current time approaches the schedule time corresponding to one or more images, the controller 440 gradually increases the size of the region of the corresponding image displayed on the display unit 450, thereby facilitating the user recognition and increasing the user convenience in using the function.

Figure 10:
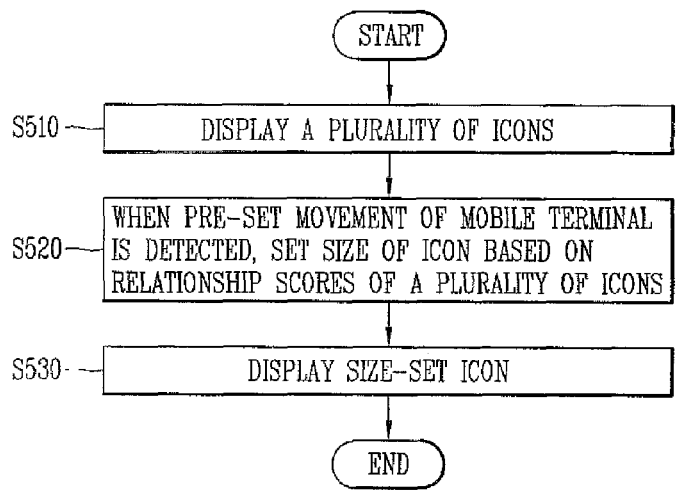
FIG. 10 is a flow chart of a fourth process for controlling a mobile terminal.
Figure 11A:
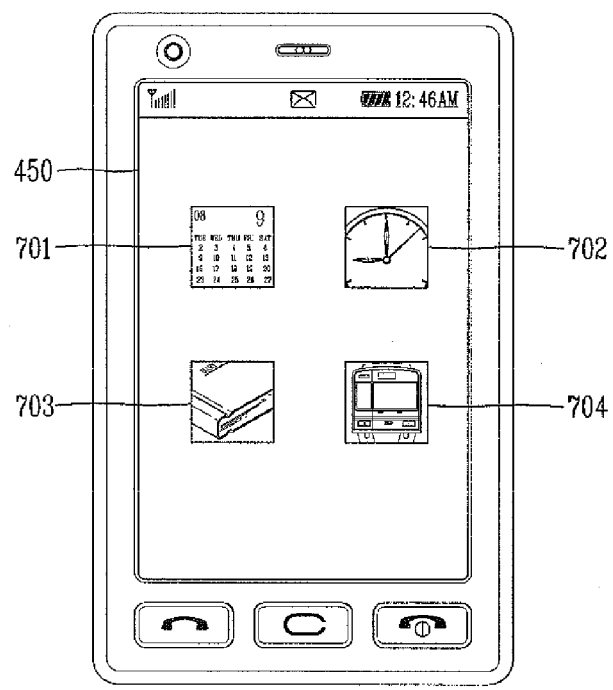
FIGS. 11A and 11B are overviews of display screens of a display unit.

FIG. 10 is a flow chart of a fourth process for controlling a mobile terminal. In the process, a plurality of icons is displayed (S510). In particular, the controller 440 displays a plurality of icons (images or items) on the display unit 450. In this case, the plurality of icons may be contents used in an application program including a widget function or a gadget function. For example, as shown in FIG. 11A, the controller 440 displays icons, such as a calendar 701, a clock 702, a schedule management 703, or a subway line map 704 including the widget function on the display unit 450.

When a preset movement of the mobile terminal is detected, the size of a plurality of icons is set based on the relationship scores of a plurality of icons (S520). In particular, when the mobile terminal 400 is detected, with the sensor unit 420, to have been wobbled more than a certain number of times in a certain direction (or when a pre-set particular button is clicked), the controller 440 sets or adjusts the size of the plurality of icons based on the relationship scores of the plurality of icons displayed on the display unit 450. Here, the relationship scores refer to scores based on the most lately updated relationship score of each icon, the use frequency of each icon, user preference information, or other information. The relationship scores may be scores which have been calculated at pre-set time intervals or calculated at the time of an event (e.g., the mobile terminal 400 is wobbled by more than the certain number of times in a certain direction).

For example, as shown in Table 3 below, relationship scores of the calendar, clock, schedule management and subway line map are calculated as 60, 90, 30, and 70, the region sizes are allocated as 24%, 36%, 12%, and 28% over the entire region (100%) according to the proportion between the relationship scores of the four icons. In this case, if the icon region is set only for 50% of the entire region, the calculated region sizes may be adjusted again. Namely, the region size calculated according to the score proportion is reduced by the certain ratio (i.e., 50%) to calculate 12%, 18%, 6% and 14%. In addition, a process of rounding off, quantization, or the like may be performed on the respective calculated region sizes to finalize the calculated region sizes. Namely, region sizes of 12%, 18%, 6%, and 14% may be finalized into region sizes of 10%, 20%, 5%, and 15%.

TABLE 3

|  | Calendar | Clock | Schedule management | Subway line map |
|---|---|---|---|---|
| Relationship score | 60 | 90 | 30 | 70 |
| Score proportion (100%) | 24% | 36% | 12% | 28% |
| Entire region (50%) | 12% | 18% | 6% | 14% |
| Final region (50%) | 10% | 20% | 5% | 15% |

Figure 11B:
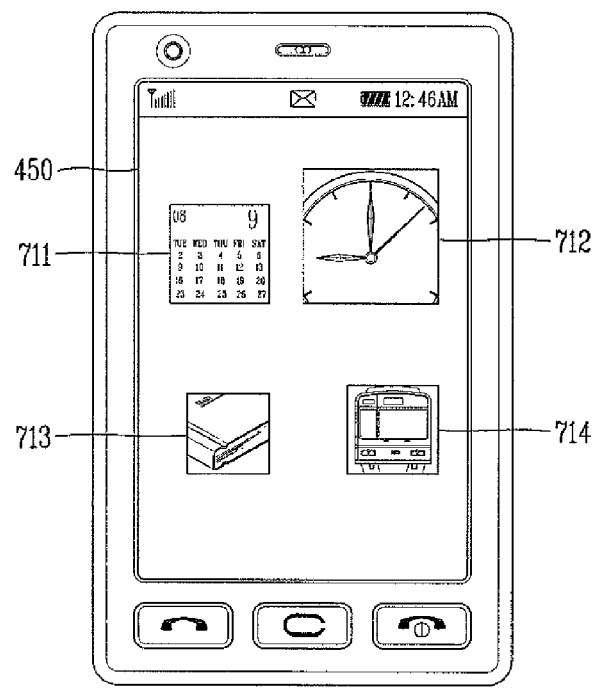

Thereafter, an icon with its size set is displayed (S530). In particular, the controller 440 displays the plurality of icons whose size has been set on the display unit 450. In this case, the plurality of icons may be displayed on the previous positions, or the positions of the plurality of icons may be reset randomly so the plurality of icons may be displayed at the reset positions. In addition, the shape of icons may remain in their previous shape or may be changed to have one of multiple possible shapes (e.g., a heart shape, a square shape, a circular shape, a diamond shape, a trapezoid shape, or a conical shape). For example, as shown in FIG. 11B, the controller 440 may display icons, such as a calendar 711, a clock 712, a schedule management 713, a subway line map 714, which have been adjusted in their size, on the display unit 450.

Figure 12:
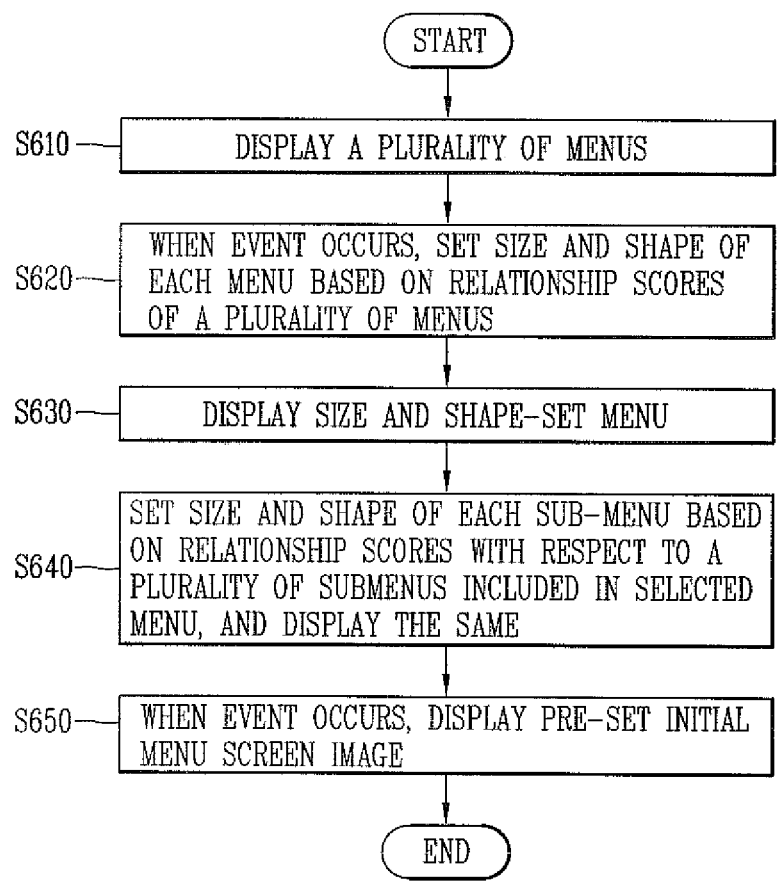
FIG. 12 is a flow chart of a fifth process for controlling a mobile terminal.
Figure 13A:
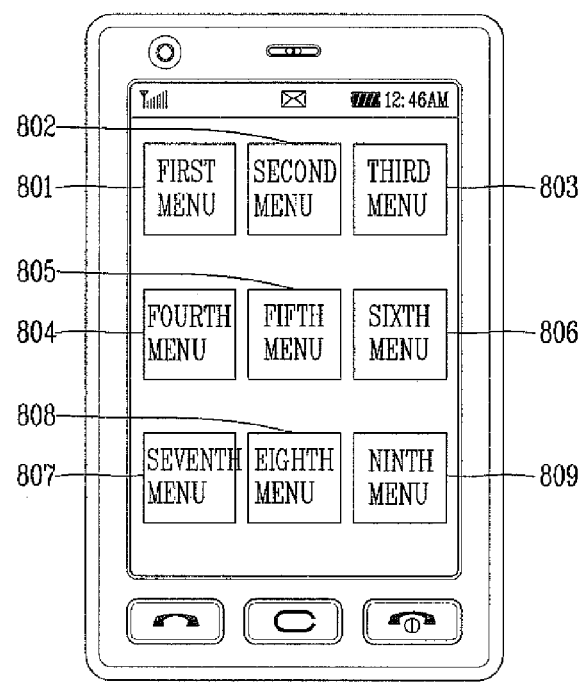
FIGS. 13A and 13B are overviews of display screens of a display unit.

FIG. 12 is a flow chart of a fifth process for controlling a mobile terminal. First, a plurality of menus is displayed (S610). In particular, when a pre-set first particular button, such as a "menu button," is clicked, the controller 440 displays a plurality of menus or items corresponding to the "menu button" on the display unit 450. In this case, the plurality of menus may be contents used in an application program including a widget function or gadget function. For example, as shown in FIG. 13A, when the menu button provided on the mobile terminal 400 is clicked, the controller 440 displays first to ninth menus 801 to 809 on the display unit 450.

Thereafter, when an event occurs, the size and shape of each menu is set based on the relationship scores of a plurality of menus (S620). In particular, when an event occurs, the controller sets the size and shape or form of each of the plurality of menus based on the relationship scores of the plurality of menus displayed on the display unit 450. Here, the relationship scores refer to scores which have been calculated based on the most recently updated relationship score with respect to each menu, the use frequency number, user preference information, and the like. In addition, the event may sensing, by the sensor unit 420, that the mobile terminal 400 has been moved by more than a certain number of times in a certain direction, the clicking of a pre-set second particular button, a pre-set movement of the user is detected by the sensor unit 420 (e.g., recognition of user's finger movement or body movement), or other events.

Figure 13B:
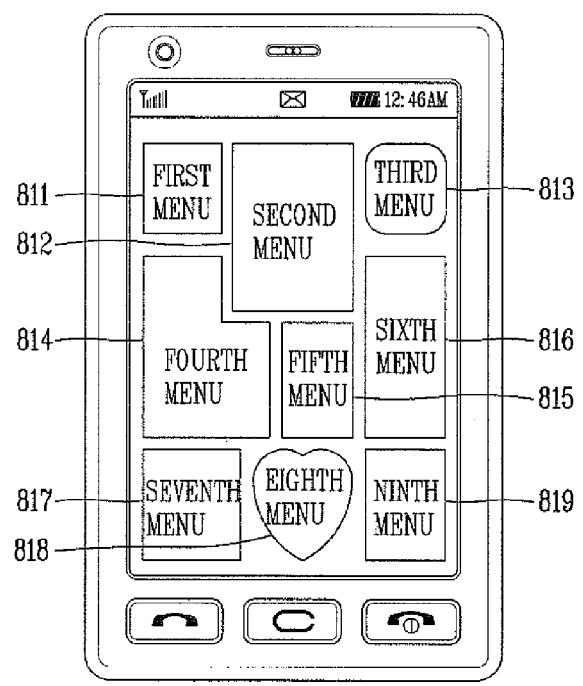

Thereafter, the menu is displayed with the set shape and size (S640). In particular, the controller 440 displays the size and shape of each set menu on the display unit 450. In this case, as for the shape of each menu, an existing shape of each menu may be maintained or the menu may be changed to have one of multiple possible shapes (e.g., a heart shape, a square shape, a circular shape, a diamond shape, a trapezoid shape, or a conical shape). For example, as shown in FIG. 13B, the controller 440 may display the first to ninth menus 811 to 819 whose size and shape have been set on the display unit 450. Among the displayed menus, the third menu 813 may be display in a circular shape, and the eighth menu 818 may be displayed in a heart shape.

Next, when a displayed menu is selected, the size and shape of sub-menus included in the selected menu is set based on the relationship scores of the sub-menus (S640). In particular, when one of the plurality of displayed menus is selected, the controller 440 sets the size and shape of each sub-menu included in the selected menu based on the relationship scores corresponding to the respective sub-menus, and display the corresponding sub-menus on the display unit 450 based on the set size and shape of the sub-menus. For example, when the second menu 812 is selected from among the first to ninth menus 811 to 819 illustrated in FIG. 13B, the controller 440 may set the size and shape of each sub-menu based on the relationship score of each sub-menu included in the second menu 812, and display the sub-menus whose size and shape have been set on the display unit 450.

Finally, when an event occurs, an pre-set initial menu screen image is displayed (S660). In particular, when the event occurs again, the controller 440 replaces the plurality of menus (or the plurality of sub-menus) displayed on the display unit 450 after having been set in the steps S620 and S640, with a pre-set menu screen. For example, when an event occurs in the state that the first to ninth menus 811 to 819, whose size and shape as shown in FIG. 13B have been adjusted, are displayed on the display unit 450, the controller 440 displays the menu screens 801 to 809 illustrated in FIG. 13A, the initial menu screen image, on the display unit 450, instead of the menu screen images 811 to 819 displayed on the display unit 450.

With the certain menu screen image displayed, when a pre-set event occurs, the controller 440 may set the size and shape of each menu based on the relationship score of each menu, and display the menus with the set size and shape on the display unit 450. Through such repeated execution of the pre-set event, the controller 440 may display each menu set according to the relationship score of each menu or the initially set menu.

The mobile terminal and processes for its control can, in various implementations, provide enhanced functionality. Such enhanced functionality can be, for example, as described below.

First, because the widget images each having a different size with respect to the previously stored phone numbers or menus are generated based on the use frequency of the previously stored phone numbers or menus or user preference information, the widget images reflecting the user preference information (e.g., the use frequency or a set value of the user) can be generated. Also, because the widget images each having a different size are generated for the previously stored phone numbers based on schedule information with respect to the previously stored phone numbers, a call connection (e.g., a phone call, transmission, or reception of text messages) with a particular user can be facilitated according to the schedule information with the particular user. In addition, when the mobile terminal is wobbled with respect to certain menu items (e.g., photo images corresponding to phone numbers or menus) displayed on the screen, widget images each having a different size are generated for the certain menu items displayed on the screen, a unique screen image can be provided to thus improve user convenience.

As the description above may be embodied in various forms without departing from the characteristics thereof, it should also be understood that the above-described implementation are not limited by any of the details of the foregoing description, unless otherwise specified, but rather, should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A method comprising:
accessing data storing multiple contact entries;
selecting, from the accessed data, at least two of the contact entries;
associating a phone number and an image with each of the at least two selected contact entries;
determining a relational characteristic for each of the selected contact entries;
determining, for each of the selected contact entries, a rendering size of the image associated with the contact entry based on the determined relational characteristic for the contact entry;
dividing available display screen size proportionately based on the determined rendering size of each of the images associated with the selected contact entries so as to utilize the available display screen;
generating a representative image that enables concurrent rendering of the images associated with the selected contact entries, wherein the representative image renders each of the images according to its determined rendering size;
enabling rendering of the generated representative image;
when an event corresponding to one of the images in the representative image occurs, activating a portion or the entire region used to display the image corresponding to the event;
increasing or decreasing the rendering size of the image based on a difference between a current time and a scheduled time included in schedule information corresponding to the image;
generating a guidance voice when the difference between the current time and the scheduled time included in the schedule information corresponding to the image is within a predetermined range; and
outputting the guidance voice via a voice output unit.

2. The method of claim 1 wherein accessing the data storing multiple contact entries includes accessing a phonebook stored in memory of a mobile telephone.

3. The method of claim 1 wherein calculating the relationship score includes determining a frequency or a quantity of interaction with the contact entry.

4. The method of claim 1 wherein determining the relational characteristic of each of the selected contact entries includes receiving input specifying a user preference related to the relational characteristic.

5. The method of claim 1 wherein the selected contact entries include a first contact entry associated with a first image and a first phone number and a second contact entry associated with a second image and a second phone number, wherein the first and second phone numbers differ and the first and second images differ.

6. The method of claim 5 wherein:
determining the relational characteristic for each of the selected contact entries includes:
determining a first relational characteristic for the first contact entry, and
determining a second relational characteristic for the second contact entry, wherein the first relational characteristic is different than the second relational characteristic;
determining the rendering size of the image associated with the contact entry based on the determined relational characteristic for the contact entry includes:
determining a first rendering size of the first image based on the determined first relational characteristic for the first contact entry, and
determining a second rendering size of the second image based on the determined second relational characteristic for the second contact entry, wherein the first rendering size is different than the second rendering size; and
generating a representative image that enables concurrent rendering of the images associated with the selected contact entries, wherein the representative image renders each of the images according to its determined rendering size;
enabling rendering of the generated representative image; and
when an event occurs, activating a portion or the entire region used to display an image corresponding to the event.

7. The method of claim 6 further comprising:
receiving input directed to a region used to display the first image of the rendered representative image; and
activating functionality directed to the first contact entry in response to receiving the input directed to the first image.

8. The method of claim 6 wherein the first image is a photograph and the second image is an icon.

9. The method of claim 1 wherein determining the rendering size of the image includes determining a dynamic rendering size for at least one image, wherein the dynamic rendering size enables the rendering size of the image to increase or decrease with respect to time.

10. The method of claim 1 wherein determining a dynamic rendering size for at least one image includes determining a dynamic rendering size of multiple images.

11. The method of claim 1 wherein selecting the at least two contact entries includes selecting, from the accessed data, the phone number and the image associated with each of the at least two selected contact entries.

12. The method of claim 1 wherein the selecting of the at least two of the contact entries occurs after the associating of the phone number and the image with the at least two contact entries.

13. The method of claim 1 wherein determining the rendering size of the image includes determining a rendering size of a region of the representative image and associating the determined rendering size of the region of the composite display with the image.

14. The method of claim 1 wherein generating the representative image includes dividing available display screen size proportionately based on the value of the determined rendering size of each of the images.

15. The method of claim 1 further comprising when the activated region is selected, performing a previously stored function corresponding to the event.

16. The method of claim 1, wherein the event is one of the case where a text message is transmitted from a particular terminal and the case where a call connection signal is transmitted.

17. The method of claim 1 further comprising selecting a design from a plurality of designs, and
wherein the rendering size of the image is further based on the selected design.

18. The method of claim 1 further comprising:
displaying, on the activated region, a plurality of menu items associated with the image corresponding to the event, when the activated region is selected.

19. A communication terminal comprising:
a computer-readable medium configured to store multiple contact entries and a phone number and an image associated with each of the multiple contact entries;
a display unit; and
a controller configured to:
access, from the computer-readable medium, data storing multiple contact entries,
select, from the accessed data, at least two of the contact entries,
determine a relational characteristic for each of the selected contact entries,
determine, for each of the selected contact entries, a rendering size of the image associated with the contact entry based on the determined relational characteristic for the contact entry,
divide available display screen size proportionately based on the determined rendering size of each of the images associated with the selected contact entries so as to utilize the available display screen,
generate a representative image that enables concurrent rendering of the images associated with the selected contact entries, wherein the representative image renders each of the images according to its determined rendering size,
render, on the display unit, the generated representative image,
when an event corresponding to one of the images in the representative image occurs, activate a portion or the entire region used to display the image corresponding to the event,
increase or decrease the rendering size of the image based on a difference between a current time and a scheduled time included in schedule information corresponding to the image;
generate a guidance voice when the difference between the current time and the scheduled time included in the schedule information corresponding to the image is within a predetermined range, and
output the guidance voice via a voice output unit.

20. The communication terminal of claim 19, wherein the controller further configured to display, on the activated region, a plurality of menu items associated with the image corresponding to the event, when the activated region is selected.

* * * * *